United States Patent
Kawaguchi

(10) Patent No.: US 10,521,203 B2
(45) Date of Patent: Dec. 31, 2019

(54) APPARATUS AND METHOD TO FACILITATE EXTRACTION OF UNUSED SYMBOLS IN A PROGRAM SOURCE CODE

(71) Applicant: FUJITSU LIMITED, Kawasaki-shi, Kanagawa (JP)

(72) Inventor: Yuki Kawaguchi, Numadu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/909,951

(22) Filed: Mar. 1, 2018

(65) Prior Publication Data
US 2018/0267783 A1 Sep. 20, 2018

(30) Foreign Application Priority Data
Mar. 15, 2017 (JP) ................. 2017-049926

(51) Int. Cl.
G06F 8/41 (2018.01)
G06F 8/72 (2018.01)
G06F 8/54 (2018.01)

(52) U.S. Cl.
CPC .............. *G06F 8/433* (2013.01); *G06F 8/425* (2013.01); *G06F 8/443* (2013.01); *G06F 8/54* (2013.01); *G06F 8/72* (2013.01)

(58) Field of Classification Search
None
See application file for complete search history.

(56) References Cited

U.S. PATENT DOCUMENTS

| | | | | |
|---|---|---|---|---|
| 2005/0289519 A1* | 12/2005 | Sazegari | ................. | G06F 8/443 717/136 |
| 2006/0242188 A1* | 10/2006 | Tsyganskiy | ............... | G06F 8/72 |
| 2011/0131559 A1* | 6/2011 | Young | ..................... | G06F 8/314 717/145 |
| 2011/0131561 A1 | 6/2011 | Adams, III et al. | | |
| 2013/0055223 A1* | 2/2013 | Xu | .......................... | G06F 8/427 717/143 |
| 2014/0359585 A1* | 12/2014 | Marvie | ..................... | G06F 8/41 717/139 |
| 2017/0308457 A1* | 10/2017 | Barsness | ................... | G06F 8/30 |

FOREIGN PATENT DOCUMENTS

| | | |
|---|---|---|
| JP | 4-149732 | 5/1992 |
| JP | 2000-207226 | 7/2000 |
| JP | 2011-118901 | 6/2011 |

OTHER PUBLICATIONS

"Marking as deprecated in C++14", Mansfield, Jun. 9, 2014 (Year: 2014).*

* cited by examiner

*Primary Examiner* — Daxin Wu
(74) *Attorney, Agent, or Firm* — Fujitsu Patent Center

(57) ABSTRACT

An apparatus adds attribute information that is used for outputting a warning that use of a symbol is non-recommended to the symbol that is included in a source code. The apparatus determines whether or not the warning corresponding to the attribute information is output for the symbol in compilation of the source code, determines that the symbol is an unused symbol which is not used in a process which is described in the source code in a case where the warning is not output, and outputs information of the unused symbol.

7 Claims, 26 Drawing Sheets

FIG. 3

SOURCE CODE 30

31
```
// sample.cpp (source file A)
int global_x;
int global_y;

void func01(void){
    int x;
} void func02(void){
} void func03(void){
    func02();
}
```

32
```
// main.cpp (source file B)
extern  C {
    int global_x;
    int global_y;
    void func01(void);
    void func02(void);
    void func03(void);
} int main(void){
    global_x = 10;
    func03();
    return 0;
}
```

FIG. 4

SOURCE CODE

```
// sample.cpp (source file A)
[[deprecated]] int global_x;
[[deprecated]] int global_y;

[[deprecated]] void func01(void){
    [[deprecated]] int x;
}

[[deprecated]] void func02(void){
}

[[deprecated]] void func03(void){
    func02();
}
```

```
// main.cpp (source file B)
extern C {
  [[deprecated]] int global_x;
  [[deprecated]] int global_y;
  [[deprecated]] void func01(void);
  [[deprecated]] void func02(void);
  [[deprecated]] void func03(void);
} int main(void){
    global_x = 10;
    func03();
    return 0;
}
```

FIG. 7

```
1    struct [[deprecated("warning")]] X{};
2
3    enum [[deprecated("")]] { ZERO, ONE };
4
5    [[deprecated("")]] int const x = 10;
6
7    [[deprecated("")]] void func(void){}
8
9    int main(void){
10       X a;
11
12       int zero = ZERO;
13       int one = ONE;
14
15       int tmp_x = x;
16
17       func();
18
19       return 0;
20   }
```

```
1   $ g++-6.1.0 main.cpp -std=c++14
2   main.cpp: In function 'int main()':
3   main.cpp:10:5: warning: 'X' is deprecated: warning
4   [-Wdeprecated-declarations]
5       X a;
6       ^
7   main.cpp:1:34: note: declared here
8    struct [[deprecated("warning")]] X{};
9                                    ^
10  main.cpp:15:15: warning: 'x' is deprecated:
11  [-Wdeprecated-declarations]
12      int tmp_x = x;
13                  ^
14  main.cpp:5:30: note: declared here
15   [[deprecated("")]] int const x = 10;
16                               ^
17  main.cpp:17:3: warning: 'void func()' is deprecated:
18  [-Wdeprecated-declarations]
19      func();
20      ^~~~
21  main.cpp:7:25: note: declared here
22   [[deprecated("")]] void func(void){}
23                          ^~~~
24  main.cpp:17:8: warning: 'void func()' is deprecated:
25  [-Wdeprecated-declarations]
26      func();
27          ^
28  main.cpp:7:25: note: declared here
29   [[deprecated("")]] void func(void){}
30                          ^~~~
```

```
1    // sample.cpp
2    int global_x;
3    [[deprecated]] int global_y;
4    
5    struct X{
6        int x;
7        static int y;
8    };
9    int X::y;
10   
11   void func01(){
12       int x = global_y;
13   }
14   
15   void func02(){
16   }
17   
18   void func03(){
19       func02();
20   }
```

```
1   // main.cpp
2   extern  C {
3       int global_x;
4       [[deprecated]] int global_y;
5       void func01();
6       void func02();
7       void func03();
8   }
9
10  struct X{
11      int x;
12      static int y;
13  };
14  int X::y;
15
16  int main(void){
17      global_x = 10;
18      func03();
19      return 0;
20  }
```
112

FIG. 14

```
   ...
5  struct X{
6      [[deprecated]] int x;         // OK
7      [[deprecated]] static int y;  // undefined behavior
8  };
9  [[deprecated]] int X::y;          // OK
   ...
```
111p

FIG. 15

```
1  $ g++-6.1.0 sample.cpp Ofast  flto  c  o sample.o
2  $ g++-6.1.0 main.cpp Ofast  flto  c  o main.o
3  $ g++-6.1.0 sample.o main.o  flto
```

FIG. 18

| LIST OF sample.cpp | | |
|---|---|---|
| ELEMENT NAME | USE FLAG | USER DEFINITION PARAMETER |
| int global_x | — | X |
| int global_y | — | Y |
| struct X | — | X |
| int X::x | — | X |
| static int X::y | — | X |
| void func01() | — | X |
| void func02() | — | X |
| void func03() | — | X |

FIG. 19

| LIST OF main.cpp | | |
|---|---|---|
| ELEMENT NAME | USE FLAG | USER DEFINITION PARAMETER |
| int global_x | — | X |
| int global_y | — | Y |
| void func01(void) | — | X |
| void func02(void) | — | X |
| void func03(void) | — | X |
| struct X | — | X |
| int X::x | — | X |
| static int X::y | — | X |

FIG. 23A

| LIST OF sample.cpp ||| L10 |
|---|---|---|
| ELEMENT NAME | USE FLAG | USER DEFINITION PARAMETER |
| int global_x | FALSE | X |
| int global_y | TRUE | Y |
| struct X | FALSE | X |
| int X::x | FALSE | X |
| static int X::y | FALSE | X |
| void func01() | FALSE | X |
| void func02() | TRUE | X |
| void func03() | FALSE | X |

FIG. 23B

| LIST OF main.cpp ||| L20 |
|---|---|---|
| ELEMENT NAME | USE FLAG | USER DEFINITION PARAMETER |
| int global_x | TRUE | X |
| int global_y | FALSE | Y |
| void func01(void) | FALSE | X |
| void func02(void) | FALSE | X |
| void func03(void) | TRUE | X |
| struct X | FALSE | X |
| int X::x | FALSE | X |
| static int X::y | FALSE | X |

FIG. 26

| MERGED LIST | | |
|---|---|---|
| ELEMENT NAME | USE FLAG | USER DEFINITION PARAMETER |
| int global_x | TRUE | X |
| int global_y | TRUE | Y |
| struct X | FALSE | X |
| int X::x | FALSE | X |
| static int X::y | FALSE | X |
| void func01(void) | FALSE | X |
| void func02(void) | TRUE | X |
| void func03(void) | TRUE | X |

```
1   warning : unused element
2
3       sample.cpp - line 5   "struct X{..."
4       sample.cpp - line 6   "int x;"
5       sample.cpp - line 7   "static int y;"
6       sample.cpp - line 9   "int X::y;"
7       sample.cpp - line 11  "void func01(){..."
8
9       main.cpp - line 5   "void func01();"
10      main.cpp - line 10  "struct X{..."
11      main.cpp - line 11  "int x;"
12      main.cpp - line 12  "static int y;"
13      main.cpp - line 14  "int X::y;"
```

11b

APPARATUS AND METHOD TO FACILITATE EXTRACTION OF UNUSED SYMBOLS IN A PROGRAM SOURCE CODE

CROSS-REFERENCE TO RELATED APPLICATION

This application is based upon and claims the benefit of priority of the prior Japanese Patent Application No. 2017-49926, filed on Mar. 15, 2017, the entire contents of which are incorporated herein by reference.

FIELD

The embodiments discussed herein are related to apparatus and method to facilitate extraction of unused symbols in a program source code.

BACKGROUND

In a development field of computer software, developers often use a high-level language such as the C programming language as a programming language. A source code described in a high-level language may be converted into an object code that is executable by a processor by a compiler. Further, an object file that includes an object code is coupled with another object file that is referred to from the object code or a library by a linker, and an executable file may thereby be generated.

Here, because multiple codes may be described in a source code, it may not be easy to find corrected part or the like by a developer. Accordingly, a method has been conceived which supports development of software by a developer.

For example, a system has been suggested which performs assessments about whether symbol information in an input file is a definition of a symbol (PUBLIC declaration) or a reference to a symbol (EXTERN declaration) for all pieces of symbol information and creates a symbol table which records assessment results about the symbols. In this suggestion, a symbol that is only defined but not referred to is specified based on the symbol table.

Further, a code optimization device has also been suggested which analyzes codes of a source program and thereby extracts symbol-dependent information which indicates that each code symbol refers to which other symbol. In this suggestion, codes that correspond to symbols which are not used in execution of a load module are deleted from a program.

In addition, a system has also been suggested which creates a correction code in which external information is removed from the original code, loads the correction code to a memory in runtime, and thereby intends to reduce the memory usage amount. In this suggestion, in a case where there is a request for external information during runtime, the external information of an appropriate type is found by a prescribed key that is inserted in the correction code and is thereby loaded. Examples of external information include debugging information for an error report due to exceptional treatment, unnecessary source information for regular execution of a program order, and so forth.

Japanese Laid-open Patent Publication No. 4-149732, Japanese Laid-open Patent Publication No. 2000-207226, and Japanese Laid-open Patent Publication No. 2011-118901 are examples of related art.

SUMMARY

According to an aspect of the invention, an apparatus adds attribute information that is used for outputting a warning that use of a symbol is non-recommended to the symbol that is included in a source code. The apparatus determines whether or not the warning corresponding to the attribute information is output for the symbol in compilation of the source code, determines that the symbol is an unused symbol which is not used in a process which is described in the source code in a case where the warning is not output, and outputs information of the unused symbol.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram that illustrates an example (No. 1) of a source code of the first embodiment;

FIG. 4 is a diagram that illustrates an example (No. 2) of a source code of the first embodiment;

FIG. 7 is a diagram that illustrates an example of the source code to which a deprecated attribute is attached;

FIG. 8 is a diagram that illustrates an output example of a warning message of non-recommendation;

FIG. 10 is a diagram that illustrates an example (No. 1) of a source file;

FIG. 11 is a diagram that illustrates an example (No. 2) of a source file;

FIG. 14 is a diagram that illustrates an addition example of the deprecated attribute;

FIG. 15 is a diagram that illustrates a command example in a case of using LTO;

FIG. 18 is a diagram that illustrates an example (No. 1) of a list;

FIG. 19 is a diagram that illustrates an example (No. 2) of a list;

FIGS. 23A and 23B are diagrams that illustrate examples of the lists in which use flags are set;

FIG. 26 is a diagram that illustrates an example of a merged list;

FIG. 27 is a diagram that illustrates a display example of a warning that indicates that elements are unused;

DESCRIPTION OF EMBODIMENTS

For example, it is possible to implement, to a compiler, a function to assess a symbol, which is not used in execution of a load module corresponding to a concerned program, among symbols that are defined in a source code. However, it is not easy to search for all the symbols in the source code, separately make a function to seek the definitions and references of the respective symbols, and separately implement the function to the compiler. Thus, there is room for improvement.

It is desirable to facilitate implementation of an extraction function of unused symbols.

The embodiments will hereinafter be described with reference to drawings.

[First Embodiment]

Figure 1:
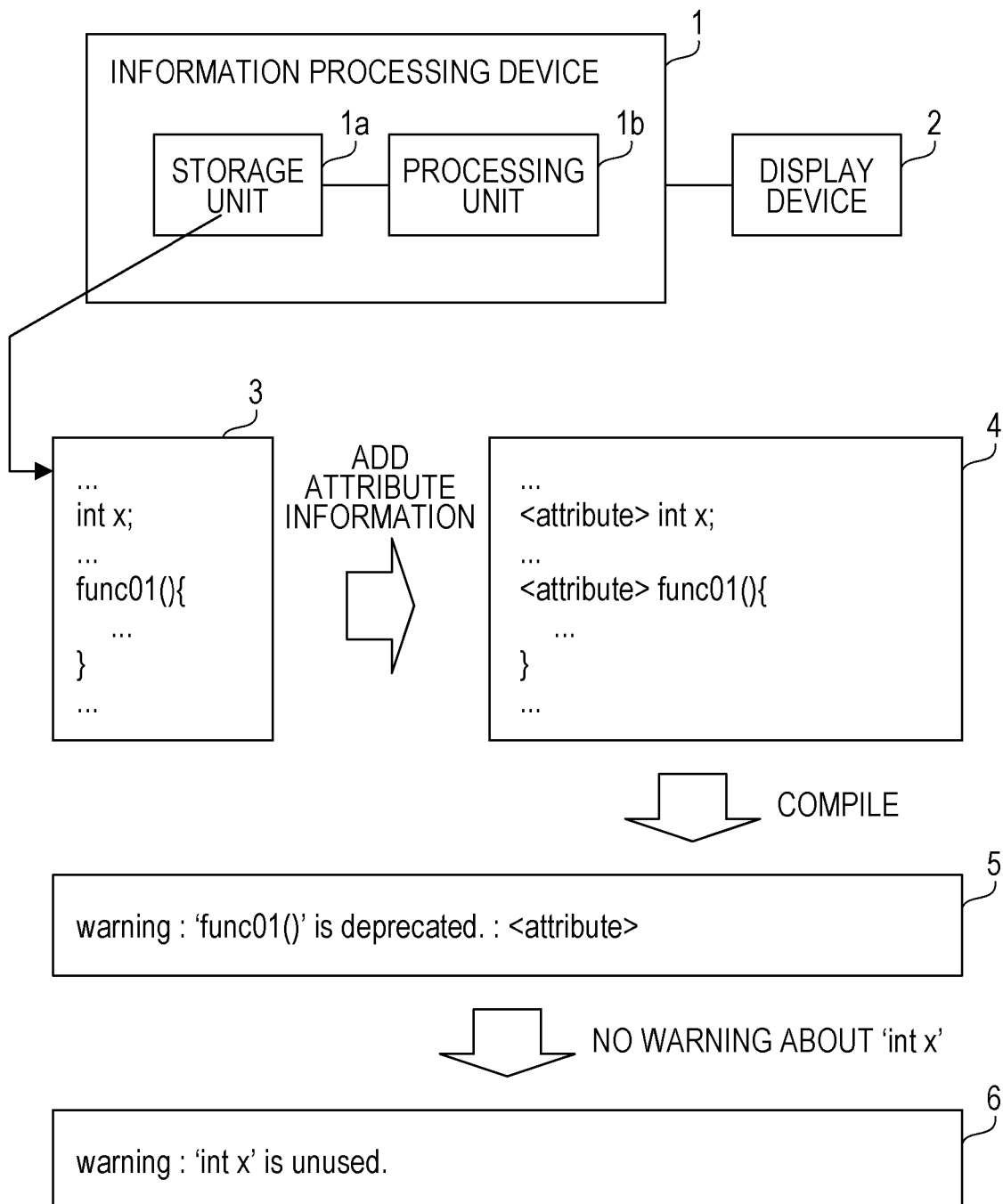
FIG. 1 is a diagram that illustrates an information processing device of a first embodiment.

FIG. 1 is a diagram that illustrates an information processing device of a first embodiment. An information processing device 1 functions as a compiler and is used for compiling a source code. The information processing device 1 is connected with a display device 2. The display device 2 is used for displaying information that is output by the information processing device 1. The information processing device 1 has a storage unit 1*a* and a processing unit 1*b*.

The storage unit 1*a* may be a volatile storage device such as a random access memory (RAM) or may be a non-volatile storage device such as a hard disk drive (HDD) or a flash memory. The processing unit 1*b* may include a central processing unit (CPU), a digital signal processor (DSP), an application specific integrated circuit (ASIC), a field programmable gate array (FPGA), and so forth. The processing unit 1*b* may be a processor that executes a program. "Processor" mentioned here may include an aggregation of plural processors (multi-processor).

The storage unit 1*a* stores a source code 3. The source code 3 is created by a user. The source code 3 may be referred to as source program. For example, the source code 3 is described by using a high-level language such as C++ or JAVA®. The source code 3 includes plural symbols. A symbol is an identification name that represents an element such as a variable, a function, a class, or a structure, which is included in the source code 3.

The processing unit 1*b* adds attribute information that is used for outputting a warning that use of a symbol is non-recommended about the symbol that is included in the source code 3 stored in the storage unit 1*a*. An output of the warning that use of the symbol is non-recommended is an output by the compiler that compiles the source code 3.

The processing unit 1*b* executes a compiler program that is stored in the storage unit 1*a* and may thereby provide the function of the compiler. Alternatively, the function of the compiler may be provided by a prescribed computation device that the information processing device 1 has. The attribute information may be referred to as metadata, tag, annotation, or the like. Some compilers fundamentally include a function to determine whether or not the relationship between a variable and a function, a class, or the like that refers to the variable and a declared or defined function, class, or the like are actually executed in a generation course of an object code and to output a non-recommendation warning corresponding to the attribute information. Examples of such attribute information include a deprecated attribute that is used in a compiler for C++, JAVA, or the like.

The deprecated attribute is used in a case where a failure is found from a function that already exists or for making a past function be non-recommended in a case where a better and new function comes out. As one example, in C++, the deprecated attribute may be designated for a class type, an alias of type, a variable, a non-static member variable, a function, and an enumeration type. Specifically, a prescribed code that includes the character string of deprecated is inserted in a prescribed position for a description part of the declaration or definition of a symbol in the source code 3 (for example, immediately before the symbol), and the deprecated attribute may thereby be attached to the symbol. For example, in a case where the symbol to which the "deprecated attribute" is attached is used, the compiler warns that the concerned symbol is a non-recommended function or presents an alternative function.

As one example, in FIG. 1, the character string that is correspondent to the attribute information is written as "attribute". For example, the source code 3 includes a variable "x" of an integer type (int type) and a function "func01( )". The variable "x" is one symbol of plural symbols included in the source code 3. Further, the function "func01" is one symbol of the plural symbols included in the source code 3. For example, the processing unit 1*b* adds a code "<attribute>" that is correspondent to the attribute information immediately before the definition "int x;" of the symbol "x" included in the source code 3. Similarly, the processing unit 1*b* adds the code "<attribute>" that is correspondent to the attribute information immediately before the definition "func01( ){ . . . }" of the symbol "func01" included in the source code 3. Here, it is assumed that a program language exemplified in FIG. 1 has a protocol of enclosing the attribute information by signs of "<" and ">". A source code 4 is a result of addition of the attribute information to each of the symbols of the source code 3.

However, the processing unit 1*b* may add the attribute information to prescribed intermediate information that is obtained as a result of performing a prescribed syntactic analysis (a process at a previous phase to object code creation) of the source code 3.

The processing unit 1*b* assesses whether or not the compiler outputs the warning corresponding to the attribute information to the symbol in a case of compilation of the source code 4. In a case where the warning is not output for a certain symbol, the processing unit 1*b* decides that the symbol is an unused symbol that is not used in the process described in the source code 4 (or the source code 3). Examples of "unused symbol" may include a variable that is declared or defined but is not referred to by the function, class, or the like which is executed by the object code which corresponds to the concerned source code, and the function, class, or the like for which only the declaration or definition is present but which is not executed.

For example, it is assumed that the processing unit 1*b* obtains an output 5 as the warning by the compiler corresponding to the attribute information. The output 5 includes the warning that the symbol "func01( )" is non-recommended but does not include the warning that the symbol "int x" is non-recommended. Thus, the processing unit 1*b* assesses that the symbol "func01( )" is a symbol that is used in the process described in the source code 4. On the other hand, the processing unit 1b decides that the symbol "x" is the unused symbol that is not used in the process described in the source code 4.

Note that because the output 5 is the warning corresponding to the attribute information that is attached by the processing unit 1b, the information of the output 5 may be recorded in a log or the like in the storage unit 1a, but the contents of the output 5 may not be displayed by the display device 2. Here, in this example, whether or not the symbol "func01( )" is "truly" non-recommended may be unmentioned. Rather, because the processing unit 1b adds the attribute information to each symbol in order to divert the function corresponding to the attribute information by the compiler to another usage than the fundamental function (that is, specifying an unused symbol), the symbol "func01( )" may not be non-recommended. However, it is possible that in order for the compiler to achieve the fundamental function corresponding to the attribute information (a warning about a non-recommended function), the attribute information that is added by the user is distinguished from the attribute information that is added by the processing unit 1b.

Specifically, the processing unit 1b may distinguish first type attribute information (for a notification about a fundamental non-recommendation warning) that is added by an operation by the user from second type attribute information that is added by the processing unit 1b for specifying a non-used symbol. For example, the processing unit 1b sets the attribute information that is in advance described in the source code 3 as the first type, sets the attribute information that is added by the processing unit 1b in compilation as the second type, and thereby performs distinction. Then, the processing unit 1b may control display contents of the non-recommendation warning by the compiler by the display device 2 in accordance with which of the first type or the second type attribute information the warning about the symbol included in the output 5 corresponds to. That is, the processing unit 1b may perform control so as to cause the non-recommendation warning to be displayed in a case of the first type and to cause the non-recommendation warning not to be displayed in a case of the second type.

The processing unit 1b outputs information of the unused symbol. For example, the processing unit 1b may output a code in the source code 4, which is correspondent to the declaration or definition of the unused symbol, to the display device 2 and may cause the display device 2 to display the code. More specifically, the processing unit 1b may cause the display device 2 to display the contents of an output 6 that includes a message which indicates the symbol "int x" is unused, as "warning: 'int x' is unused."

Next, process procedures by the information processing device 1 will be described.

Figure 2:
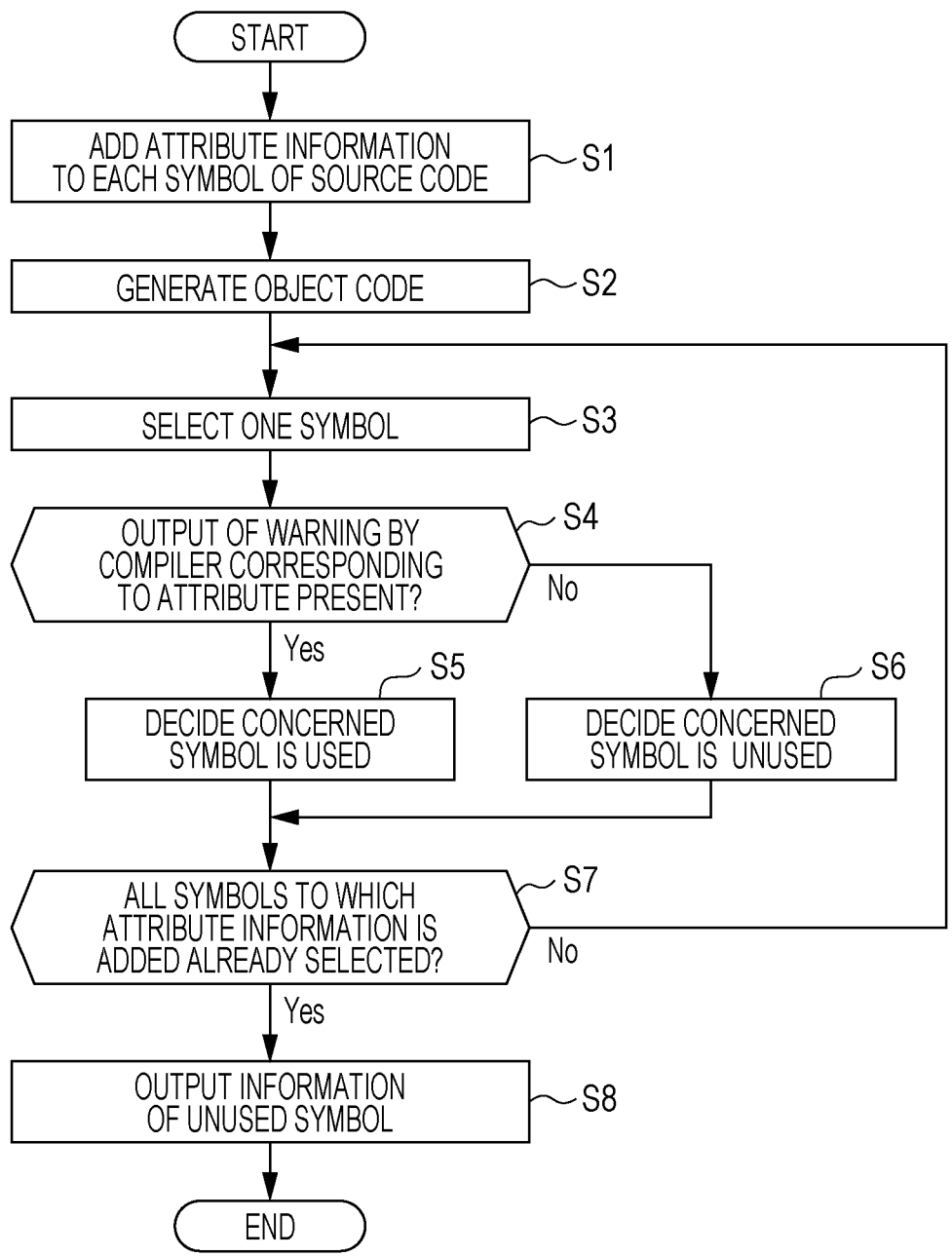
FIG. 2 is a flowchart that illustrates a process example of the first embodiment.

FIG. 2 is a flowchart that illustrates a process example of the first embodiment. In the following, a process illustrated in FIG. 2 will be described along step numbers.

(S1) When the processing unit 1b receives an instruction for compiling the source code 3, the processing unit 1b adds the attribute information to each of the symbols of the source code 3.

(S2) The processing unit 1b generates the object code that corresponds to the source code 4 (or the intermediate information that is correspondent to the source code 4) by the function of the compiler.

(S3) The processing unit 1b selects one symbol included in the source code 4 (or the source code 3). A symbol to be a selection target is a symbol which is not yet selected in the present process.

(S4) The processing unit 1b assesses whether or not an output of the warning by the compiler, which corresponds to the attribute information added in step S1, (an output of the non-recommendation warning) is present. In a case where the warning is present, the processing unit 1b moves the process to step S5. In a case where the warning is not present, the processing unit 1b moves the process to step S6.

(S5) The processing unit 1b decides that the concerned symbol is used. Then, the processing unit 1b moves the process to step S7.

(S6) The processing unit 1b decides that the concerned symbol is unused. Then, the processing unit 1b moves the process to step S7.

(S7) The processing unit 1b assesses whether or not all the symbols to which the attribute information is added in step S1 are already selected (whether the selection in step S3 is performed). In a case where all the symbols to which the attribute information is added are already selected, the processing unit 1b moves the process to step S8. In a case where not all the symbols to which the attribute information is added are already selected, the processing unit 1b moves the process to step S3.

(S8) The processing unit 1b outputs the information of the unused symbol. For example, the processing unit 1b causes the display device 2 to display the contents of the output 6.

In such a manner, the processing unit 1b adds the attribute information that is used for outputting the non-recommendation warning by the compiler to each of the symbols and thereby identifies whether each of the symbols is used or not used in accordance with presence or absence of the non-recommendation warning by the compiler about each of the symbols.

Accordingly, the function that is fundamentally included in the compiler is diverted, and implementation of an extraction function of unused symbols may thereby be facilitated. Further, the processing unit 1b outputs the information of the unused symbol and may thereby support finding of the unused symbol by the user (a developer of software) and an improvement of the source code 3.

Further, because the processing unit 1b performs an extraction process of the unused symbol by using the result of an output process of the non-recommendation warning by the compiler, the processing unit 1b may not execute the extraction process of the unused symbol by a separate routine. Specifically, the processing unit 1b does not have to perform a checking process of whether or not each of the symbols is used, separately from a compilation process. Thus, an efficiency improvement in the extraction process of the unused symbol may be intended. Further, the processing unit 1b may make extraction of the unused symbol faster than separately performing a routine for extracting the unused symbol.

In addition, in a case where the source code 3 is again compiled, it is possible for the processing unit 1b to set the unused symbols included in the source code 3 as non-targets of compilation based on the information of the unused symbols.

Note that the source code 3 may be created while being divided into plural source files. For example, each of the source files may be created by a separate user, in a separate place, and at a separate time and may separately be compiled. In this case, the information processing device 1 couples (links) object files that are individually created for the respective source files and thereby generates an executable file.

Even in a case where the source code 3 is created while being divided into the plural source files in such a manner, the information processing device 1 may provide a function to extract the unused symbols from the whole source code 3. Details are as follows. Note that in the following, C++ is raised as one example of programming languages (however, other programming languages may be used).

FIG. 3 is a diagram that illustrates an example (No. 1) of a source code of the first embodiment. A source code 30 is created while being divided into source files 31 and 32. The source files 31 and 32 are managed as individual files. The file name of the source file 31 is "sample.cpp". The file name of the source file 32 is "main.cpp".

The processing unit 1b individually compiles the source files 31 and 32. In this case, the processing unit 1b adds the deprecated attribute to each of the symbols included in each of the source files 31 and 32 while following the protocol of C++.

FIG. 4 is a diagram that illustrates an example (No. 2) of a source code of the first embodiment. A source code 40 is the result of addition of the deprecated attribute to each of the symbols of the source files 31 and 32 included in the source code 30. The source code 40 includes source files 41 and 42. The source file 41 is the result of addition of the deprecated attribute to each of the symbols of the source file 31. The source file 42 is the result of addition of the deprecated attribute to each of the symbols of the source file 32. In this case, the attribute information is correspondent to a code portion of "[[deprecated]]" that is surrounded by double square bracket signs "[[" and "]]". As described above, the symbol as an addition target of the deprecated attribute and an addition method of the deprecated attribute are decided in accordance with the protocol of C++.

Note that FIG. 4 illustrates an example where the deprecated attribute is added to each of the source files 41 and 42. However, as described above, prescribed intermediate information that corresponds to each of the source files 41 and 42 may be created in a state where the deprecated attribute is added.

Figure 5:
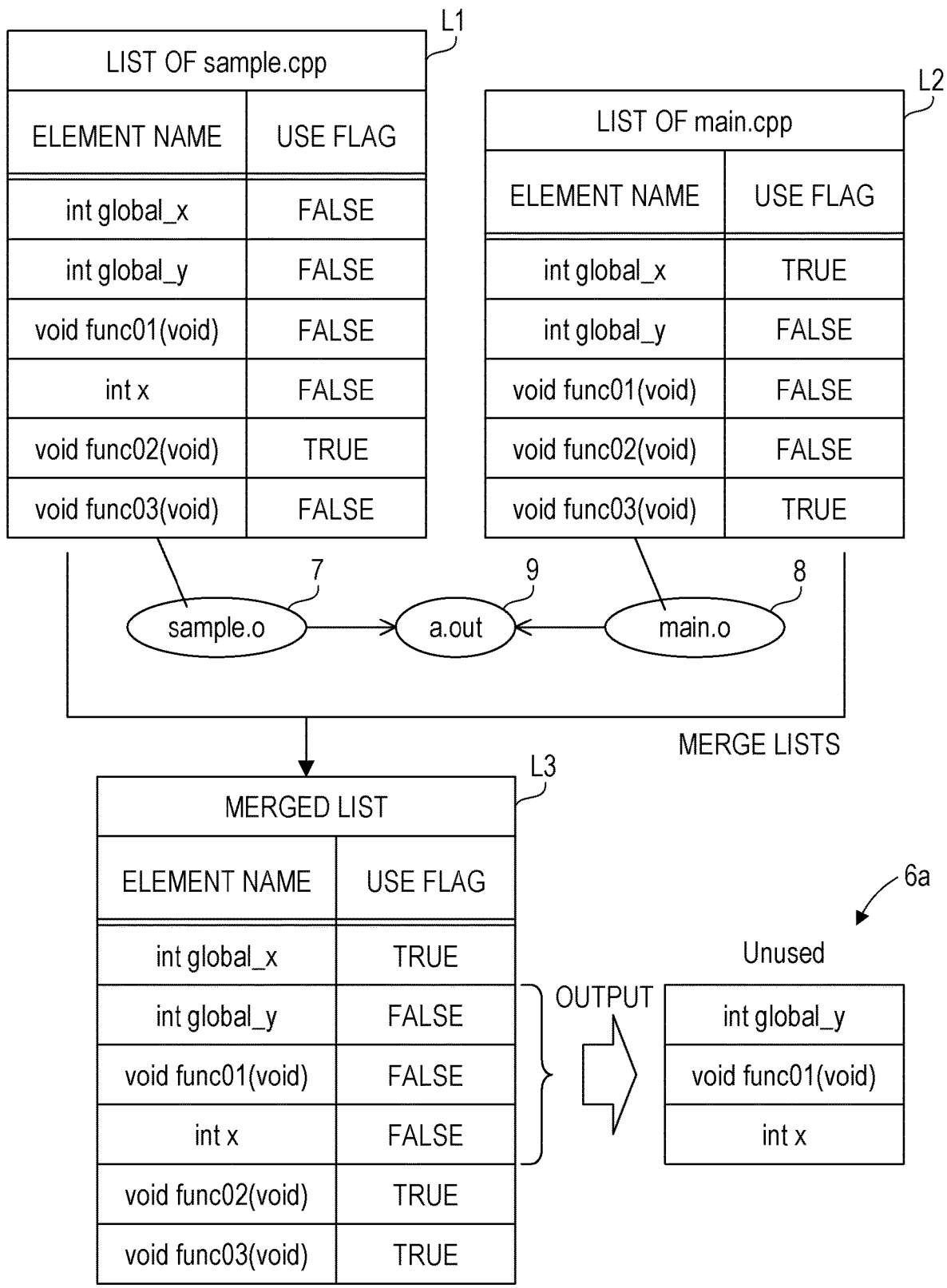
FIG. 5 is a diagram that illustrates another output example of the unused symbols of the first embodiment.

FIG. 5 is a diagram that illustrates another output example of the unused symbols of the first embodiment. The processing unit 1b executes the procedures in FIG. 2 for the source file 31 and thereby creates a list L1 for the source file 31. The list L1 is an output result of the information of the unused symbols about the source file 31. The processing unit 1b adds the list L1 to an object file 7 that corresponds to the source file 31 (or the source file 41). The processing unit 1b stores the created object file 7 in the storage unit 1a. The file name of the object file 7 is "sample.o", for example.

Here, the list L1 is the information that indicates the association relationship between an element name which corresponds to the symbol included in the source file 31 and a use flag. A use flag is a flag that indicates that the concerned symbol is assessed as "used" or assessed as "unused" by the procedures in FIG. 2. For example, a use flag "TRUE" indicates "used". A use flag "FALSE" indicates "unused".

Similarly, the processing unit 1b executes the procedures in FIG. 2 for the source file 32 and thereby creates a list L2 for the source file 32. The list L2 is an output result of the information of the unused symbols about the source file 32. The processing unit 1b adds the list L2 to an object file 8 that corresponds to the source file 32 (or the source file 42). The processing unit 1b stores the created object file 8 in the storage unit 1a. The file name of the object file 8 is "main.o", for example. Here, similarly to the list L1, the list L2 is the information that indicates the association relationship between the element name which corresponds to the symbol included in the source file 32 and the use flag.

Then, the processing unit 1b performs a linking process for the object file 7 and the object file 8 by a function of a linker and creates an executable file 9 (a.out). Here, the processing unit 1b merges the list L1 included in the object file 7 and the list L2 included in the object file 8, thereby creates a merged list L3, and extracts the unused symbols based on the list L3.

Particularly, the processing unit 1b performs optimization that is referred to as link time optimization (LTO) in the linking process. The link time optimization enables not only the optimization of individual object files but also the optimization across the object files (for example, inlining of functions, constant propagation, and so forth across the object files and throughout the whole program). Note that in a case where the LTO is used, a compilation option is selected in compilation such that prescribed intermediate representation (for example, Gimple data) is left in the object file. Creation of the list L3 and extraction of the unused symbols by the processing unit 1b may be performed in execution of the LTO, for example.

For example, the processing unit 1b registers the element name that is included in at least one of the lists L1 and L2 in an item of the element name of the list L3. Further, the processing unit 1b refers to the use flag in each of the list L1 and L2 with respect to the element name registered in the list L3 and sets the use flag for the element name in the list L3 as "TRUE" in a case where the use flag in at least one of the list L1 and L2 is "TRUE". In a case where the use flag in both of those is "FALSE", the processing unit 1b sets the use flag for the element name in the list L3 as "FALSE".

Then, the processing unit 1b decides that the symbol for the element name whose use flag in the list L3 is "FALSE" is the unused symbol that is not used in the process described in the source code 30 (that is, the process that is executed by the executable file 9).

In such a manner, the processing unit 1b determines that the symbol that is used in at least any of the object files as link targets is used based on the list L1 and L2. On the other hand, the processing unit 1b determines that the symbol that is not used in any of the object files as the link targets is the unused symbol.

For example, in the case of the example of FIG. 5, the processing unit 1b assesses a variable "global_y", a function "func01(void)", and the variable "x" as the unused symbols based on the list L3. Accordingly, for example, the processing unit 1b outputs a fact that the descriptions for those unused symbols "int global_y", "void func01(void)", and "int x" are unused (Unused) and causes the display device 2 to display the output. An output 6a is one example of the warning that the symbol is unused. For example, the processing unit 1b may cause the display device 2 to display the contents of the output 6a.

In such a manner, also in a case where division compilation is performed, the processing unit 1b adds the list L1 to the object file 7, adds the list L2 to the object file 8, and becomes thereby capable of extracting the unused symbols based on the lists L1 and L2 in the linking process (in the LTO). Further, the information of the unused symbol that is extracted in such a manner is output, and finding of the unused symbol by the user (the developer of software) and an improvement of the source code 30 may thereby be supported. Further, in a case where the source files 31 and 32 are again compiled, it is possible for the processing unit 1*b* to set the unused symbols included in the source files 31 and 32 as non-targets of compilation based on the information of the unused symbols.

In the following, as one example of the information processing device 1, a computer that performs compilation and a linking process of source codes (referred to as compiler device) will be exemplified, and the function of the information processing device 1 will be described more specifically.

[Second Embodiment]

Figure 6:
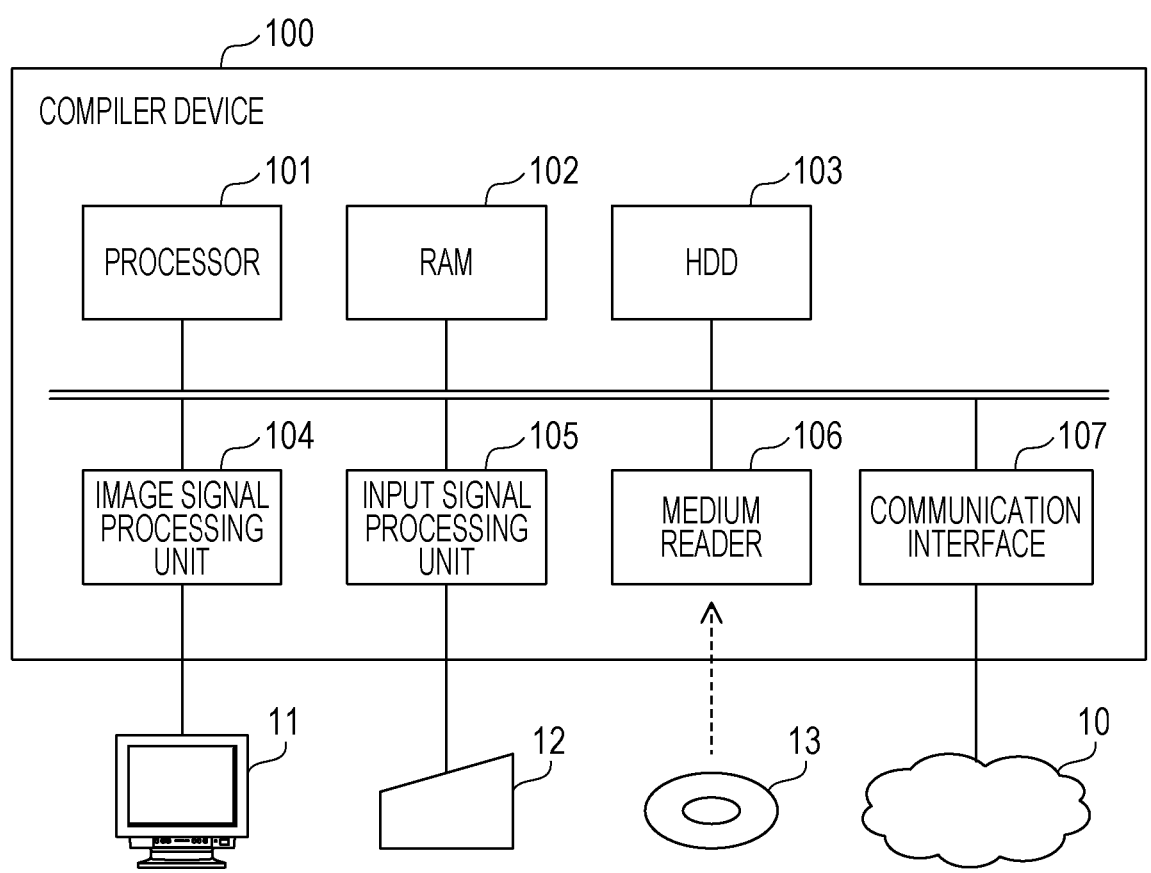
FIG. 6 is a diagram that illustrates a hardware example of a compiler device of a second embodiment.

FIG. 6 is a diagram that illustrates a hardware example of a compiler device of a second embodiment. A compiler device 100 functions as a compiler of the programming language C++.

Here, as for C++, a standard of International Organization for Standardization (ISO)/International Electrotechnical Commission (IEC) 14882:2014 (commonly referred to as C++14) has been established in the year of 2014. To C++14, a function that is referred to as [[deprecated]] attribute (which may simply be referred to as deprecated attribute) is added as a new function. In a case where an object to which this attribute is designated is used, a compiler outputs a warning message. As described above, the deprecated attribute is a function that is used in a case where a failure is found from a function which already exists or for making a past function be non-recommended in a case where a better and new function comes out.

However, the compiler that has an output function of the non-recommendation warning by the deprecated attribute may be used for other versions of C++ and other programming languages (for example, JAVA and so forth).

The compiler device 100 has a processor 101, a RAM 102, an HDD 103, an image signal processing unit 104, an input signal processing unit 105, a medium reader 106, and a communication interface 107. Each piece of hardware is connected with a bus of the compiler device 100.

The processor 101 is hardware that controls information processing by the compiler device 100. The processor 101 may be a multi-processor. The processor 101 is a CPU, a DSP, an ASIC, an FPGA, or the like, for example. The processor 101 may be a combination of two or more elements of a CPU, a DSP, an ASIC, an FPGA, and so forth.

The RAM 102 is a main storage device of the compiler device 100. The RAM 102 temporarily stores at least a portion of programs of an operating system (OS) and application programs, which are executed by the processor 101. Further, the RAM 102 stores various kinds of data that are used for processes by the processor 101.

The HDD 103 is an auxiliary storage device of the compiler device 100. The HDD 103 magnetically writes data in and reads out data from a built-in magnetic disk. The HDD 103 stores programs of the OS, the application programs, and various kinds of data. The compiler device 100 may include another kind of an auxiliary storage device such as a flash memory or a solid state drive (SSD) and may include plural auxiliary storage devices.

The image signal processing unit 104 outputs an image on a display 11 that is connected with the compiler device 100 in accordance with an order from the processor 101. As the display 11, a cathode ray tube (CRT) display, a liquid crystal display, or the like may be used.

The input signal processing unit 105 acquires an input signal from an input device 12 that is connected with the compiler device 100 and outputs the input signal to the processor 101. As the input device 12, a pointing device such as a mouse or a touch panel, a keyboard, or the like may be used, for example.

The medium reader 106 is a device that reads a program or data that are recorded in a recording medium 13. As the recording medium 13, for example, a magnetic disk such as a flexible disk (FD) or an HDD, an optical disk such as a compact disc (CD) or a digital versatile disc (DVD), or a magneto-optical disk (MO) may be used. As the recording medium 13, for example, a non-volatile semiconductor memory such as a flash memory card may also be used. The medium reader 106 stores the program or data that are read from the recording medium 13 in the RAM 102 or the HDD 103 in accordance with the order from the processor 101, for example.

The communication interface 107 performs communication with other devices via a network 10. The communication interface 107 may be a wired communication interface or may be a wireless communication interface.

FIG. 7 is a diagram that illustrates an example of the source code to which the deprecated attribute is attached. A source code P1 is one example of a source code that is described by using C++. The file name of the source code P1 is set as "main.cpp". As described above, in C++, the code of "[[deprecated]]" that is surrounded by double square bracket signs "[[" and "]]" is added to the symbol, and the attribute information for the non-recommendation warning is thereby added. Further, parenthesis signs "(" and ")" are described after "deprecated", and a message that the user desires to display as the warning may be set by the double quotation marks that are enclosed by the parenthesis signs. In a case where the message that the user desires to display is not set, nothing may be described in the double quotation marks, or the parenthesis signs and double quotation marks that follow the character string of "deprecated" may not be described.

Specifically, the first line of the source code P1 is an example where the deprecated attribute is attached to a symbol "X{ }" that represents a structure. [[deprecated ("warning")]] is the attribute information for the non-recommendation warning. A character string of "warning" included as an option of the attribute information is a message that the user desires to display, separately from the provided warning that is output by the compiler.

Further, the third line of the source code P1 is an example where the deprecated attribute is attached to a symbol "{ZERO, ONE}" that represents an enumeration type (which may also be referred to as enumeration). [[deprecated(" ")]] is the attribute information for the non-recommendation warning. The example of the third line indicates that a message that the user desires to display is not set.

In the source code P1, the deprecated attribute is attached to other symbols while following the protocol of C++. Further, a main function and the definition block of the main function (the 9th line to 20th line) are non-targets of attachment of the deprecated attribute.

FIG. 8 is a diagram that illustrates an output example of the warning message of non-recommendation. A message group 11*a* is an example of the warning message of non-recommendation that is displayed by the display 11 (that is, output contents of the non-recommendation warning by the compiler device 100) in a case where compilation of the source code P1 is performed by the compiler device 100. Note that the message group 11*a* is output by using GNU Compiler Collection (GCC) 6.1.0.

Specifically, the message group 11*a* includes the warning message that the structure "X" used in the main function in the source code P1 is non-recommended (the third line to ninth line of the message group 11a). Further, the message group 11a includes the warning message that the variable "x" used in the main function in the source code P1 is non-recommended (the 10th line to 16th line of the message group 11a). Further, the message group 11a includes the warning message that the function "func( )" used in the main function in the source code P1 is non-recommended (the 17th line to 30th line of the message group 11a).

Note that the message group 11a does not include the warning message that an enumeration type symbol in the source code P1 is non-recommended. This is because the concerned enumeration type is not used in the main function.

In such a manner, the compiler device 100 uses the function of the deprecated attribute and may thereby cause the compiler to output the warning message that the symbol used in the source code P1 is non-recommended. Here, "used symbol" is a symbol that is used in a process realized by the object code which corresponds to the source code P1 (that is a process described in the source code P1). Here, "a symbol that is not used" is a symbol that is not used in the process realized by the object code which corresponds to the source code P1 (that is the process described in the source code P1). Accordingly, the compiler device 100 utilizes the output function of the non-recommendation warning by the compiler to perform extraction of non-used symbols. Details are as follows.

Figure 9:
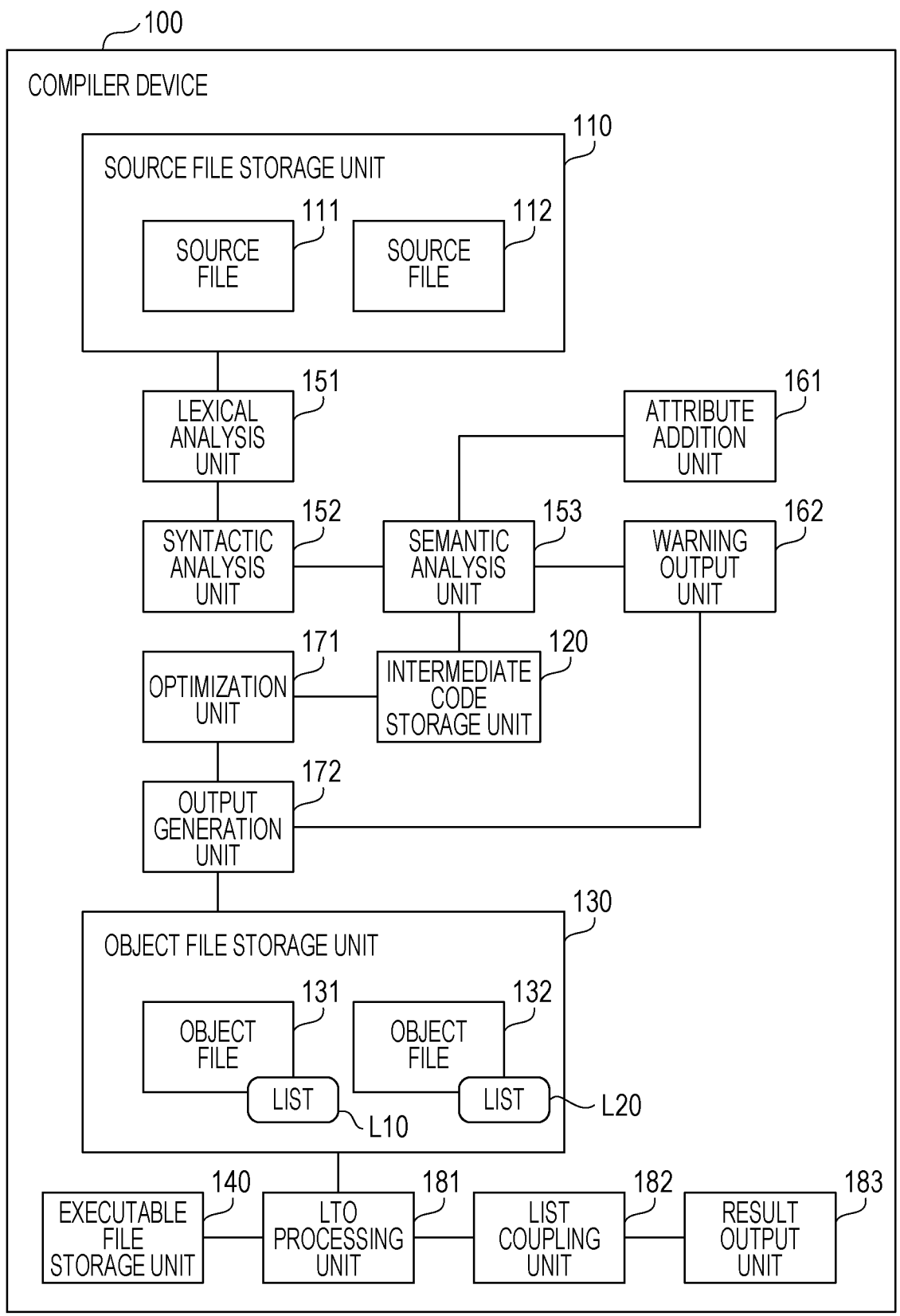
FIG. 9 is a diagram that illustrates a function example of the compiler device.

FIG. 9 is a diagram that illustrates a function example of the compiler device. The compiler device 100 has a source file storage unit 110, an intermediate code storage unit 120, an object file storage unit 130, an executable file storage unit 140, a lexical analysis unit 151, a syntactic analysis unit 152, a semantic analysis unit 153, an attribute addition unit 161, a warning output unit 162, an optimization unit 171, an output generation unit 172, an LTO processing unit 181, a list coupling unit 182, and a result output unit 183.

The source file storage unit 110 stores plural source files. For example, the source file storage unit 110 stores source files 111 and 112. The source files 111 and 112 are used for creation of a certain executable file. It is supposed that the source files 111 and 112 are managed as separate files but form one source code that corresponds to the executable file.

The intermediate code storage unit 120 stores the intermediate code that corresponds to the source files 111 and 112. An intermediate code is a code in a previous phase of an object code.

The object file storage unit 130 stores plural object files. For example, the object file storage unit 130 stores object files 131 and 132. The object file 131 is an object file that is generated based on the source file 111. The object file 132 is an object file that is generated based on the source file 112.

The executable file storage unit 140 stores an executable file that is generated as a result of the linking process for the object files 131 and 132.

The lexical analysis unit 151 performs a lexical analysis process about the source files 111 and 112. Specifically, the lexical analysis unit 151 specifies characters (letters) that are described in the source file 111 and specifies a character string (phrase) from the arrangement of the characters. The lexical analysis unit 151 similarly performs the lexical analysis process about the source file 112.

The syntactic analysis unit 152 performs a syntactic analysis process about the source files 111 and 112. Specifically, the syntactic analysis unit 152 specifies a combination (syntax) of lexical tokens that are specified by the lexical analysis unit 151 and generates information of a syntax tree. The information of a syntax tree may be considered as the intermediate information that is created in the previous phase to creation of the object code.

The semantic analysis unit 153 performs a semantic analysis process about the source files 111 and 112. Specifically, the semantic analysis unit 153 extracts orders and notations that are provided by the programming language from the syntax specified by the syntactic analysis unit 152 and generates the intermediate code that is used for an optimization process. The semantic analysis unit 153 stores the generated intermediate code in the intermediate code storage unit 120. Here, the semantic analysis unit 153 specifies the declarations or definitions of variables, functions, classes, and so forth, the call relationship of those, and so forth. Further, the semantic analysis unit 153 analyzes presence or absence of the deprecated attribute that is added by the attribute addition unit 161, which will be described later, with respect to each of the symbols and instructs the warning output unit 162 to output the non-recommendation warning about the used symbol.

The attribute addition unit 161 adds the deprecated attribute to the symbols included in the syntax tree that is created from the source file 111 while following the protocol of C++. Similarly, the attribute addition unit 161 adds the deprecated attribute to the symbols included in the syntax tree that is created from the source file 112. The semantic analysis unit 153 performs the semantic analysis process about the source files that include the added deprecated attribute.

The warning output unit 162 causes the display 11 to display the non-recommendation warning corresponding to the deprecated attribute by the instruction from the semantic analysis unit 153. Specifically, the warning output unit 162 causes the display 11 to display the non-recommendation warnings while narrowing the symbols down to the symbols in the source files 111 and 112 to which the deprecated attribute is added by the user. For example, the warning output unit 162 causes the display 11 to display the warning message that use of the function that corresponds to the concerned symbol is non-recommended. Meanwhile, the warning output unit 162 does not perform outputs of the non-recommendation warnings about the symbols to which the deprecated attribute is added by the attribute addition unit 161. Further, the warning output unit 162 creates a list that records presence or absence of the non-recommendation warning about each of the symbols and provides the list to the output generation unit 172.

Here, the list is information in which the element name, the use flag, and a user definition parameter are associated. Here, one association relationship among the element name, the use flag, and the user definition parameter will be referred to as one record. The list may include plural records. The element name is the name of the symbol (or object) that is described in the source file. That is, an element indicates a symbol (or object). The use flag is a flag that indicates whether or not the non-recommendation warning corresponding to the deprecated attribute occurs to the symbol that corresponds to the element name in compilation. The use flag "FALSE" indicates that the instruction for outputting the non-recommendation warning does not occur to the symbol. The use flag "TRUE" indicates that the instruction for outputting the non-recommendation warning occurs to the symbol. The user definition parameter is a parameter that indicates the identification result about whether the deprecated attribute attached to the symbol is user-defined or the deprecated attribute is added by the attribute addition unit 161. A user definition parameter "X" indicates that the deprecated attribute is not user-defined (that is, the deprecated attribute is added by the attribute addition unit 161). A user definition parameter "Y" indicates that the deprecated attribute is user-defined (that is, the deprecated attribute is not added by the attribute addition unit 161).

The optimization unit 171 uses the intermediate code stored in the intermediate code storage unit 120 to perform the optimization process for an intermediate code unit (that is, a compilation unit). For example, shortening of the requested time for execution of a program, lessening of the memory usage amount, or the like is intended by the optimization process by the optimization unit 171.

The output generation unit 172 generates the object file based on the optimization result by the optimization unit 171 and stores the object file in the object file storage unit 130. Here, the output generation unit 172 adds the list that is provided by the warning output unit 162 to the object file. For example, in a case where compilation is performed for the source file 111, the output generation unit 172 stores the object file 131 that corresponds to the source file 111 in the object file storage unit 130. The object file 131 includes a list L10 that records presence or absence of the non-recommendation warning about each of the symbols, which corresponds to the deprecated attribute, about the source file 111. Further, in a case where compilation is performed for the source file 112, the output generation unit 172 stores the object file 132 that corresponds to the source file 112 in the object file storage unit 130. The object file 132 includes a list L20 that records presence or absence of the non-recommendation warning about each of the symbols, which corresponds to the deprecated attribute, about the source file 112.

The LTO processing unit 181 provides the function of the linker. Specifically, the LTO processing unit 181 executes the linking process for plural object files that are stored in the object file storage unit 130. The LTO processing unit 181 executes the LTO in the linking process. The LTO processing unit 181 executes the linking process and thereby generates the executable file. The LTO processing unit 181 stores the generated executable file in the executable file storage unit 140.

The list coupling unit 182 acquires the lists that are included in the respective object files as the link targets in execution of the LTO by the LTO processing unit 181. The list coupling unit 182 couples (merges) the plural acquired lists and creates a merged list. For example, in a case where the linking process for the object files 131 and 132 is performed by the LTO processing unit 181, the list coupling unit 182 acquires the list L10 included in the object file 131 and the list L20 included in the object file 132. Then, the list coupling unit 182 merges the lists L10 and L20 and creates the merged list.

The result output unit 183 refers to the list that is created by the list coupling unit 182 (the coupled list) and specifies the symbols that are unused (unused symbols) across the object files 131 and 132. The result output unit 183 outputs the information of the unused symbols. For example, the result output unit 183 causes the display 11 to display the warning message that indicates that the unused symbols exist in the source files 111 and 112.

Here, the source file storage unit 110, the intermediate code storage unit 120, the object file storage unit 130, and the executable file storage unit 140 are realized by using a prescribed storage area that is secured in the RAM 102 or the HDD 103.

Further, the functions of the lexical analysis unit 151, the syntactic analysis unit 152, the semantic analysis unit 153, the attribute addition unit 161, the warning output unit 162, the optimization unit 171, the output generation unit 172, the LTO processing unit 181, the list coupling unit 182, and the result output unit 183 are realized by the processor 101. For example, the processor 101 executes prescribed programs that are stored in the RAM 102 and thereby provides the functions of the lexical analysis unit 151, the syntactic analysis unit 152, the semantic analysis unit 153, the attribute addition unit 161, the warning output unit 162, the optimization unit 171, the output generation unit 172, the LTO processing unit 181, the list coupling unit 182, and the result output unit 183. Those functions are implemented as the function of the software that is referred to as compiler. However, the functions may be implemented as separate pieces of software such that the functions of the lexical analysis unit 151, the syntactic analysis unit 152, the semantic analysis unit 153, the attribute addition unit 161, the warning output unit 162, the optimization unit 171, and the output generation unit 172 are implemented to the compiler and the functions of the LTO processing unit 181, the list coupling unit 182, and the result output unit 183 are implemented to the linker.

FIG. 10 is a diagram that illustrates an example (No. 1) of the source file. The file name of the source file 111 is "sample.cpp". In the source file 111, "[[deprecated]]" is attached to "int global_y;" (the third line of the source file 111). This is the deprecated attribute that is added by the user in order to notify the warning message that use of "global_y;" is non-recommended.

FIG. 11 is a diagram that illustrates an example (No. 2) of the source file. The file name of the source file 112 is "main.cpp". Similarly to the source file 111, in the source file 112, "[[deprecated]]" is attached to "int global_y;" (the fourth line of the source file 112). This is the deprecated attribute that is added by the user in order to notify the warning message that use of "global_y;" is non-recommended.

As exemplified in FIG. 10 and FIG. 11, the deprecated attribute may be in advance added to the source files 111 and 112 by the user in order to notify the fundamental warning message by the deprecated attribute. Accordingly, the compiler device 100 also provides a function to present the warning messages to the user while narrowing the warning messages down to such warning messages that are fundamentally to be notified.

Figure 12:
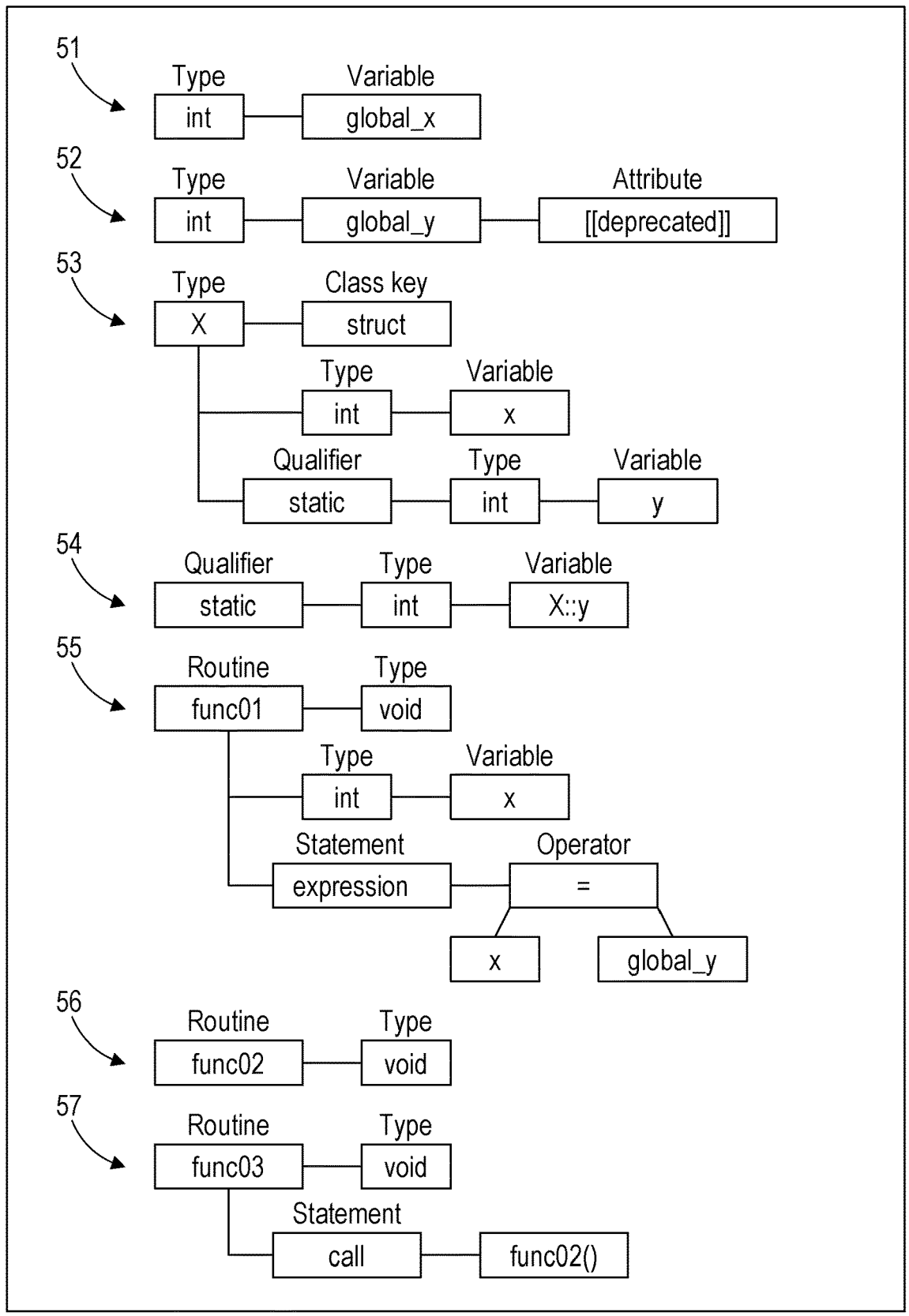
FIG. 12 is a diagram that illustrates examples (No. 1) of syntax trees.

FIG. 12 is a diagram that illustrates examples (No. 1) of syntax trees. FIG. 12 exemplifies syntax trees 51, 52, 53, 54, 55, 56, and 57 that correspond to the source file 111.

The syntax tree 51 is correspondent to the code in the second line of the source file 111. The syntax tree 52 is correspondent to the code in the third line of the source file 111. The syntax tree 53 is correspondent to the code in the fifth to eighth lines of the source file 111. The syntax tree 54 is correspondent to the code in the ninth line of the source file 111. The syntax tree 55 is correspondent to the code in the 11th to 13th lines of the source file 111. The syntax tree 56 is correspondent to the code in the 15th and 16th lines of the source file 111. The syntax tree 57 is correspondent to the code in the 18th to 20th lines of the source file 111.

A syntax tree is information that has a tree structure in which the lexical tokens described in the source file 111 are set as nodes and the joining relationships between the lexical tokens are set as edges. For example, in the second line of the source file 111, a character string "global_x" follows the character string that represents an integer type of "int". Thus, in the syntax tree 51, the node that has "int" as a type (Type) and the node that has "global_x" as a variable (Variable) are joined together by the edge.

In such a manner, the node of the syntax tree has an attribute such as the type (Type) or the variable (Variable).

In a case where the type of a class is defined by using a class key (Class key), the node of Class key (which has a value such as "struct", "class", or "union") is connected with the node of Type. The following attributes of nodes may be exemplified other than the type and the variable.

The first example is a qualifier (Qualifier) such as "static" or "const". The second example is a routine (Routine) that is correspondent to a function name or the like. The third example is an attribute (Attribute) that is correspondent to the deprecated attribute or the like.

The fourth example is a statement (Statement) that is correspondent to an expression (expression), iteration (iteration), a call (call), return (return), or the like.

For example, the node that has an attribute of an operator (Operator) (for example, an operator "=" is set) is joined to the node that has "expression" as the statement. Then, the variables that are joined together by the operator (for example, the variable "x" and the variable "global_y") are joined to the node of the operator.

Further, for example, the node of a function name to be called or the like is joined to the node that has "call" as the statement. In addition, the node for which a return value to the function as a caller is set is joined to the node that has "return" as the statement.

Figure 13:
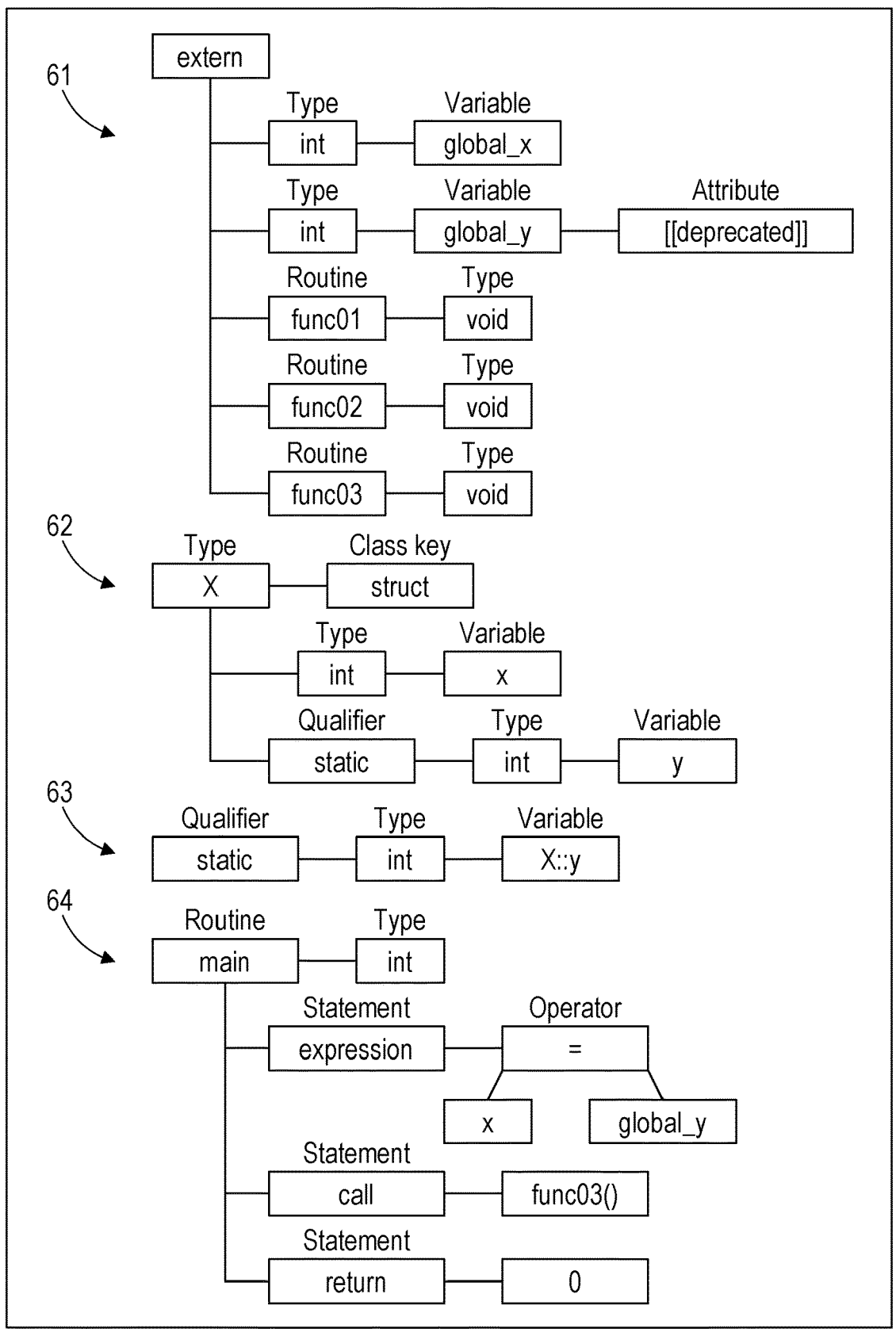
FIG. 13 is a diagram that illustrates examples (No. 2) of syntax trees.

FIG. 13 is a diagram that illustrates examples (No. 2) of syntax trees. FIG. 13 exemplifies syntax trees 61, 62, 63, and 64 that correspond to the source file 112.

The syntax tree 61 is correspondent to the code in the second to eighth lines of the source file 112. The syntax tree 62 is correspondent to the code in the 10th to 13th lines of the source file 112. The syntax tree 63 is correspondent to the code in the 14th line of the source file 112. The syntax tree 64 is correspondent to the code in the 16th to 20th lines of the source file 112.

The syntax trees 61, 62, 63, and 64 also have the tree structure in which the lexical tokens described in the source file 112 are set as the nodes and the joining relationships between the lexical tokens are set as the edges.

FIG. 14 is a diagram that illustrates an addition example of the deprecated attribute. The deprecated attribute is not appropriately processed by the compiler unless the deprecated attribute is attached in accordance with the protocol of C++. That is, the deprecated attribute may not be attached to anywhere, but places to which the attachment may be made are defined by the language standard. Particularly, attention is requested in a case where the deprecated attribute is attached to a static member variable of a class. In a sample code 111p, the deprecated attribute is attached to a portion of the codes of the source file 111. Here, it is assumed that "class" mentioned here includes a structure.

A description of "[[deprecated]] int x;" in the sixth line of the sample code 111p is permitted. On the other hand, a description of "[[deprecated]] static int y;" in the seventh line of the sample code 111p is not permitted. Here, "undefined behavior" in the seventh line of the sample code 111p is not defined by ISO/IEC 13382:2014 and is a process that behaves differently depending on the used compiler. In a case where the deprecated attribute is attached to the declaration of a static member variable of an actual class, the deprecated attribute has to be attached to the entity of a static variable in the protocol of C++. Accordingly, a description of "[[deprecated]] int X::y;" in the ninth line of the sample code 111p is proper.

For such a reason, the attribute addition unit 161 attaches the deprecated attribute to an appropriate part that is defined by the protocol of C++ based on the result of the semantic analysis process about the source code by the semantic analysis unit 153.

Note that a local variable such as the above-described "int x" (the sixth line of the sample code 111p) is detectable by an existing warning function. The compiler device 100 sets the following contents to which a reference or call across the files may occur as main attachment targets of the deprecated attribute in order to detect functions that are not used across plural files.

The first target is a global variable. The second target is a function. The third target is a class (including a structure). The fourth target is a member variable of a class. The fifth target is a static member variable of a class (however, the entity of a static member variable as described above). The sixth target is a member function of a class. The seventh target is an enumeration type. The eighth target is a union.

Thus, the attribute addition unit 161 checks whether the attachment target is appropriate in a case where the deprecated attribute is attached.

FIG. 15 is a diagram that illustrates a command example in a case of using the LTO. The user inputs a command "g++−6.1.0 sample.cpp Ofast flto c o sample.o" to the compiler device 100 and thereby instructs compilation of the source file 111 by the compiler device 100. In this case, the user designates an option "flto" and may thereby instruct the compiler device 100 about generation of the object file in consideration of an LTO process, which is a subsequent phase. The compiler device 100 compiles the source file 111 in response to an input of the command and thereby generates the object file 131. As described above, the object file 131 includes the information of the intermediate representation that is used for the LTO process. Further, the object file 131 includes the list L10.

Similarly, the user inputs a command "g++−6.1.0 main.cpp Ofast flto c o main.o" to the compiler device 100 and thereby instructs compilation of the source file 112 by the compiler device 100. The compiler device 100 compiles the source file 112 in response to an input of the command and thereby generates the object file 132. As described above, the object file 132 includes the information of the intermediate representation that is used for the LTO process. Further, the object file 132 includes the list L20.

Next, process procedures executed by the compiler device 100 will be described.

Figure 16:
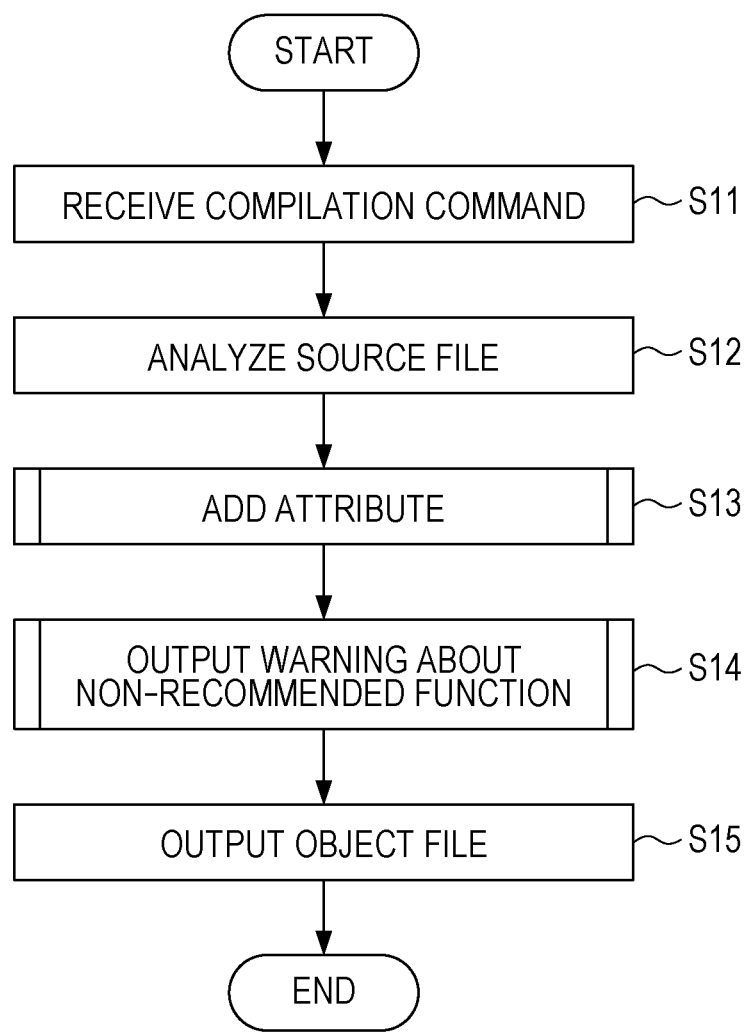
FIG. 16 is a flowchart that illustrates a compilation example of the second embodiment.

FIG. 16 is a flowchart that illustrates a compilation example of the second embodiment. In the following, a process illustrated in FIG. 16 will be described along step numbers.

(S11) The lexical analysis unit 151 receives a compilation command for the source file 111. The compilation command is the command that is indicated in the first line in FIG. 15, for example. In a case where a compilation target is the source file 112, the command that is indicated in the second line in FIG. 15 is used, for example.

(S12) The lexical analysis unit 151 performs a lexical analysis of the source file 111. Further, the syntactic analysis unit 152 performs the syntactic analysis of the source file 111 based on the result of the lexical analysis by the lexical analysis unit 151, generates the information of the syntax trees 51, 52, 53, 54, 55, 56, and 57, and stores the information in a prescribed storage area of the RAM 102. In addition, the semantic analysis unit 153 performs a semantic analysis based on the information of the syntax trees 51, 52, 53, 54, 55, 56, and 57, which is stored in the RAM 102, and notifies the attribute addition unit 161 of the analysis result.

(S13) The attribute addition unit 161 adds the deprecated attribute to prescribed symbols included in each of the syntax trees 51, 52, 53, 54, 55, 56, and 57 based on the result of the semantic analysis by the semantic analysis unit 153. Details of the process will be described later.

(S14) The warning output unit 162 performs warning outputs about the non-recommended functions corresponding to the deprecated attribute. Details of the process will be described later.

(S15) The semantic analysis unit 153 generates the intermediate code that corresponds to the source file 111 based on the result of the semantic analysis and stores the intermediate code in the intermediate code storage unit 120. The optimization unit 171 uses the intermediate code stored in the intermediate code storage unit 120 to execute a prescribed optimization process. The output generation unit 172 generates the object file 131 that corresponds to the source file 111 based on the optimization result by the optimization unit 171 and stores the object file 131 in the object file storage unit 130. Here, the output generation unit 172 acquires the list L10 that is created by the warning output unit 162 and adds the list L10 to the object file 131.

In such a manner, the compiler device 100 compiles the source file 111 and creates the object file 131. The compiler device 100 similarly creates the object file 132 for the source file 112.

Figure 17:
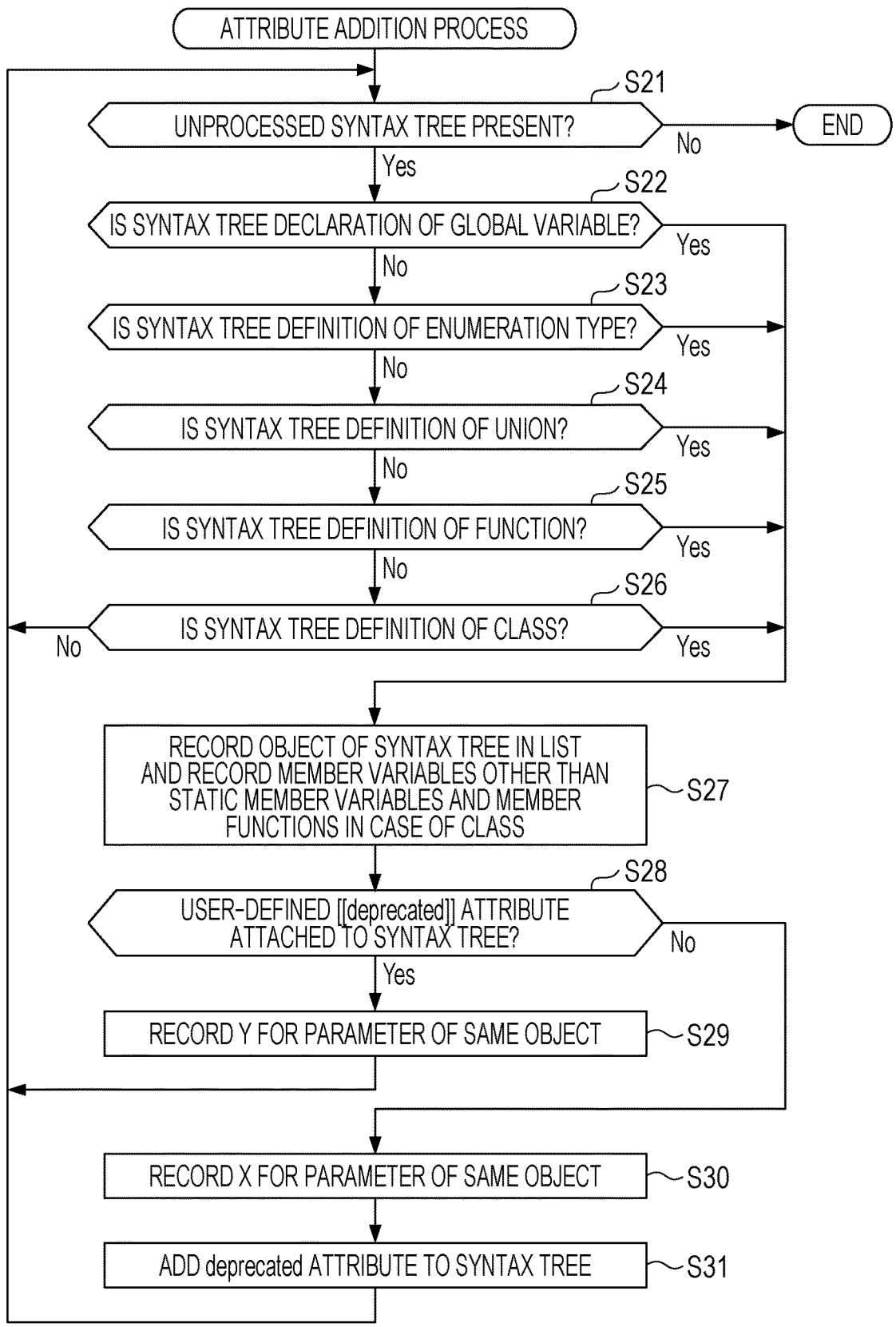
FIG. 17 is a flowchart that illustrates an attribute addition example of the second embodiment.

FIG. 17 is a flowchart that illustrates an attribute addition example of the second embodiment. In the following, a process illustrated in FIG. 17 will be described along step numbers. The procedures indicated in the following are correspondent to step S13 in FIG. 16.

(S21) The attribute addition unit 161 assesses whether or not an unprocessed syntax tree (the syntax tree for which the process of step S22 and subsequent steps is not performed) is present among the syntax trees 51, 52, 53, 54, 55, 56, and 57 that are stored in the RAM 102. In a case where the unprocessed syntax tree is present, the attribute addition unit 161 selects one unprocessed syntax tree and moves the process to step S22. In a case where the unprocessed syntax tree is not present, the attribute addition unit 161 finishes the process.

(S22) The attribute addition unit 161 assesses whether or not the concerned syntax tree is the declaration of the global variable. In a case where the concerned syntax tree is the declaration of the global variable, the attribute addition unit 161 moves the process to step S27. In a case where the concerned syntax tree is not the declaration of the global variable, the attribute addition unit 161 moves the process to step S23. For example, in a case where the concerned syntax tree is the variable that is declared in a part which does not belong to the block which is correspondent to the structure, function, or the like in the program, the attribute addition unit 161 assesses the syntax tree as the declaration of the global variable. In a case where the concerned syntax tree is not the variable that is declared in a part which does not belong to the block which is correspondent to the structure, function, or the like in the program, the attribute addition unit 161 assesses the syntax tree as not the declaration of the global variable.

(S23) The attribute addition unit 161 assesses whether or not the concerned syntax tree is the definition of the enumeration type. In a case where the concerned syntax tree is the definition of the enumeration type, the attribute addition unit 161 moves the process to step S27. In a case where the concerned syntax tree is not the definition of the enumeration type, the attribute addition unit 161 moves the process to step S24. For example, in a case where the concerned syntax tree is the definition by Type "enum", the attribute addition unit 161 assesses the concerned syntax tree as the definition of the enumeration type. In a case where the concerned syntax tree is not the definition by Type "enum", the attribute addition unit 161 assesses the concerned syntax tree as not the definition of the enumeration type.

(S24) The attribute addition unit 161 assesses whether or not the concerned syntax tree is the definition of the union. In a case where the concerned syntax tree is the definition of the union, the attribute addition unit 161 moves the process to step S27. In a case where the concerned syntax tree is not the definition of the union, the attribute addition unit 161 moves the process to step S25. For example, in a case where the concerned syntax tree has the node of Class key "union", the attribute addition unit 161 assesses the concerned syntax tree as the definition of the union. In a case where the concerned syntax tree does not have the node of Class key "union", the attribute addition unit 161 assesses the concerned syntax tree as not the definition of the union.

(S25) The attribute addition unit 161 assesses whether or not the concerned syntax tree is the definition of the function. In a case where the concerned syntax tree is the definition of the function, the attribute addition unit 161 moves the process to step S27. In a case where the concerned syntax tree is not the definition of the function, the attribute addition unit 161 moves the process to step S26. For example, in a case where the concerned syntax tree has the node of Routine as a root, the attribute addition unit 161 assesses the concerned syntax tree as the definition of the function. In a case where the concerned syntax tree does not have the node of Routine as the root, the attribute addition unit 161 assesses the concerned syntax tree as not the definition of the function. However, because the attribute addition unit 161 exceptionally sets the concerned syntax tree as a non-target of attachment of the deprecated attribute in a case where the node of Routine represents the main function, the attribute addition unit 161 moves the process to step S21.

(S26) The attribute addition unit 161 assesses whether or not the concerned syntax tree is the definition of the class. In a case where the concerned syntax tree is the definition of the class, the attribute addition unit 161 moves the process to step S27. In a case where the concerned syntax tree is not the definition of the class, the attribute addition unit 161 moves the process to step S21. For example, in a case where the concerned syntax tree has the node of Class key "struct" or Class key "class", the attribute addition unit 161 assesses the concerned syntax tree as the definition of the class. In a case where the concerned syntax tree does not have the node of Class key "struct" or Class key "class", the attribute addition unit 161 assesses the concerned syntax tree as not the definition of the class.

(S27) The attribute addition unit 161 records the object of the concerned syntax tree in the list L10. In a case where the concerned object is the class, the attribute addition unit 161 records the member variables other than the static member variables and the member functions in the list L10. Note that immediately before step S27 is first executed in compilation of a certain source file, the attribute addition unit 161 creates the list (an empty list in which nothing is initially recorded) for the concerned source file and stores the list in a prescribed storage area of the RAM 102.

(S28) The attribute addition unit 161 assesses whether or not the user-defined [[deprecated]] attribute (deprecated attribute) is attached to the concerned syntax tree. In a case where the user-defined deprecated attribute is attached to the concerned syntax tree, the attribute addition unit 161 moves the process to step S29. In a case where the user-defined deprecated attribute is not attached to the concerned syntax tree, the attribute addition unit 161 moves the process to step S30.

(S29) The attribute addition unit 161 records "Y" in the parameter (specifically, the user definition parameter) of the same object in the list L10. Then, the attribute addition unit 161 moves the process to step S21.

(S30) The attribute addition unit 161 records "X" in the parameter (specifically, the user definition parameter) of the same object in the list L10.

(S31) The attribute addition unit 161 adds the deprecated attribute to the concerned syntax tree. Specifically, in step S27, the attribute addition unit 161 joins the node of attribute to the node of the object of the syntax tree that is recorded in the list L10 and set "[[deprecated]]" to the node of attribute. Note that in a case where the concerned object is the class, the attribute addition unit 161 similarly adds the deprecated attribute to the member variables other than the static member variables and the member functions. Then, the attribute addition unit 161 moves the process to step S21.

Note that in the above description, a description is made about the procedures of attribute addition in compilation of the source file 111. The attribute addition unit 161 similarly performs the attribute addition to the source file 112.

Further, the attribute addition unit 161 may include a check about whether or not the syntax tree is the definition of the entity of the static member variable of the class in the check about the variable in step S22. For example, as the syntax tree 54, in a case of the definition of the entity of a static member variable "X::y" of a class "X" that uses the scope resolution operator "::", the attribute addition unit 161 moves the process to step S27. Then, the attribute addition unit 161 performs registration of the element name and the user definition parameter of the object in the list L10 and addition of the deprecated attribute.

FIG. 18 is a diagram that illustrates an example (No. 1) of a list. A list L11 is an example of a list that is created by the attribute addition unit 161 in the course of compilation of the source file 111 (the file name "sample.cpp") (the phase immediately subsequent to the procedures in FIG. 17). The list L11 represents the state of the previous phase to the list L10. The list L11 includes items of the element name, the use flag, and the user definition parameter.

For example, the list L11 includes the record in which the element name is "int global_x", the use flag is not set (in FIG. 18, the hyphen sign "-" represents no setting), and the user definition parameter is "X". This indicates that a program element of "int global_x" exists in the source file 111, presence or absence of the non-recommendation warning is not yet assessed, and the user-defined deprecated attribute is not present for "int global_x". This case indicates that the deprecated attribute is added to "int global_x" by the attribute addition unit 161.

Further, the list L11 includes the record in which the element name is "int global_y", the use flag is not set, and the user definition parameter is "Y". This indicates that a program element of "int global_y" exists in the source file 111, presence or absence of the non-recommendation warning is not yet assessed, and the user-defined deprecated attribute is present for "int global_y".

In the list L11, the association relationship among the element name, the use flag, and the user definition parameter is similarly registered for the other program elements that are included in the source file 111 (here, the elements as the attachment targets of the deprecated attribute). However, in the phase at which the procedures in FIG. 17 are completed, the use flags are not set.

FIG. 19 is a diagram that illustrates an example (No. 2) of a list. A list L21 is an example of a list that is created by the attribute addition unit 161 in the course of compilation of the source file 112 (the file name "main.cpp") (the phase immediately subsequent to the procedures in FIG. 17). The list L21 represents the state of the previous phase to the list L20. The list L21 includes items of the element name, the use flag, and the user definition parameter.

Similarly to the list L11, in the list L21, the association relationship among the element name, the use flag, and the user definition parameter are registered for the program elements that are included in the source file 112 (here, the elements as the attachment targets of the deprecated attribute). However, in the phase at which the procedures in FIG. 17 are completed, the use flags are not set.

Figure 20:
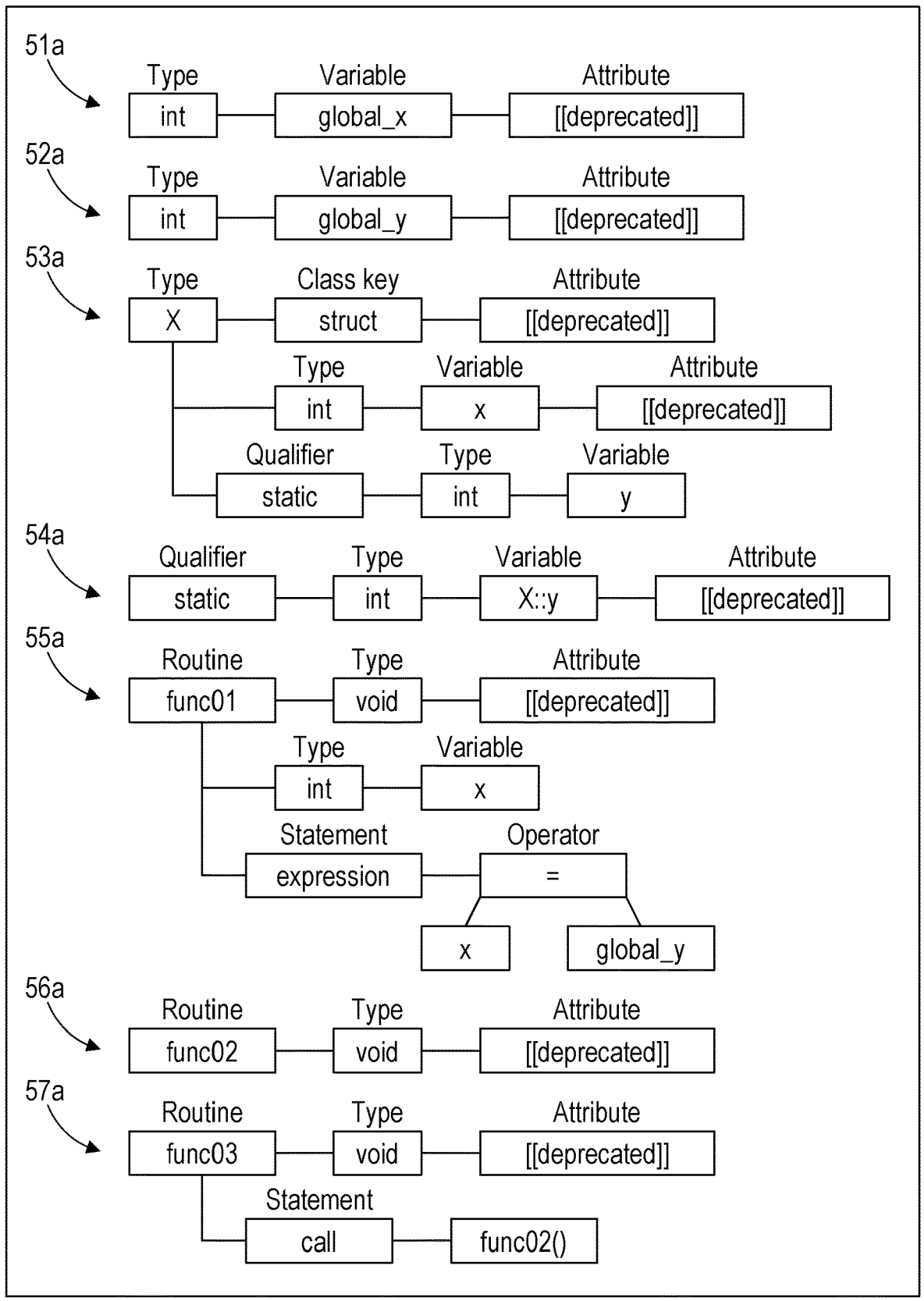
FIG. 20 is a diagram that illustrates examples (No. 1) of syntax trees (to which deprecated is added)

FIG. 20 is a diagram that illustrates examples (No. 1) of syntax trees (to which deprecated is added). Syntax trees 51a, 52a, 53a, 54a, 55a, 56a, and 57a indicate the state where the deprecated attribute is added to the syntax trees 51, 52, 53, 54, 55, 56, and 57. Particularly, in the syntax tree 53a, "[[deprecated]]" is added to the structure "X", and further "[[deprecated]]" is added to the member variable "x" other than the static member variable of the structure "X". On the other hand, in the syntax tree 53a, "[[deprecated]]" is not added to the static member variable "y" of the structure "X". Instead, "[[deprecated]]" is added to the definition of the entity of the static member variable "y" of the syntax tree 54a.

Figure 21:
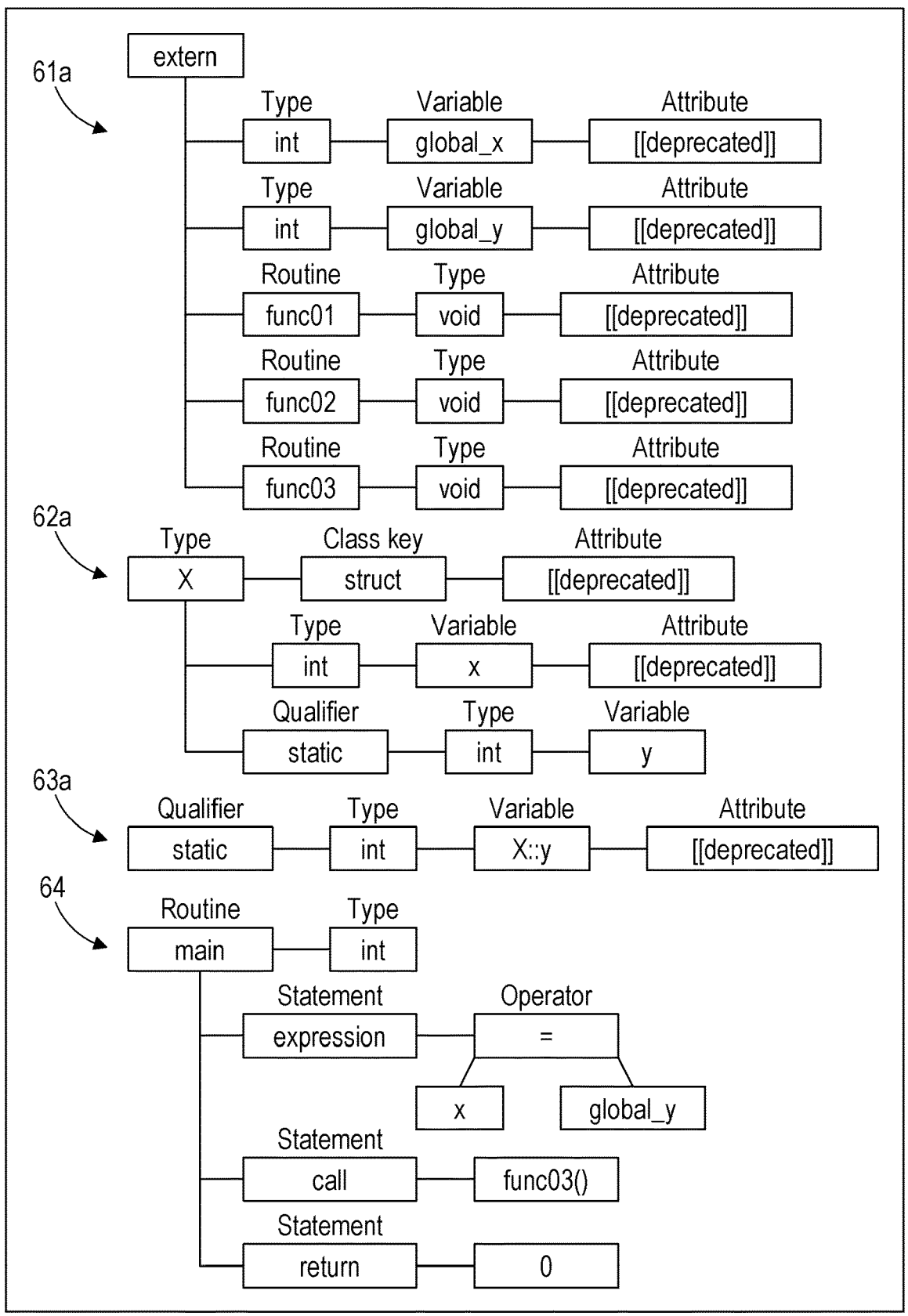
FIG. 21 is a diagram that illustrates examples (No. 2) of syntax trees (to which deprecated is added)

FIG. 21 is a diagram that illustrates examples (No. 2) of syntax trees (to which deprecated is added). Syntax trees 61a, 62a, and 63a indicate the state where the deprecated attribute is added to the syntax trees 61, 62, and 63. Note that because the syntax tree 64 is the syntax tree that represents the main function, the deprecated attribute is not added, as described above.

Figure 22:
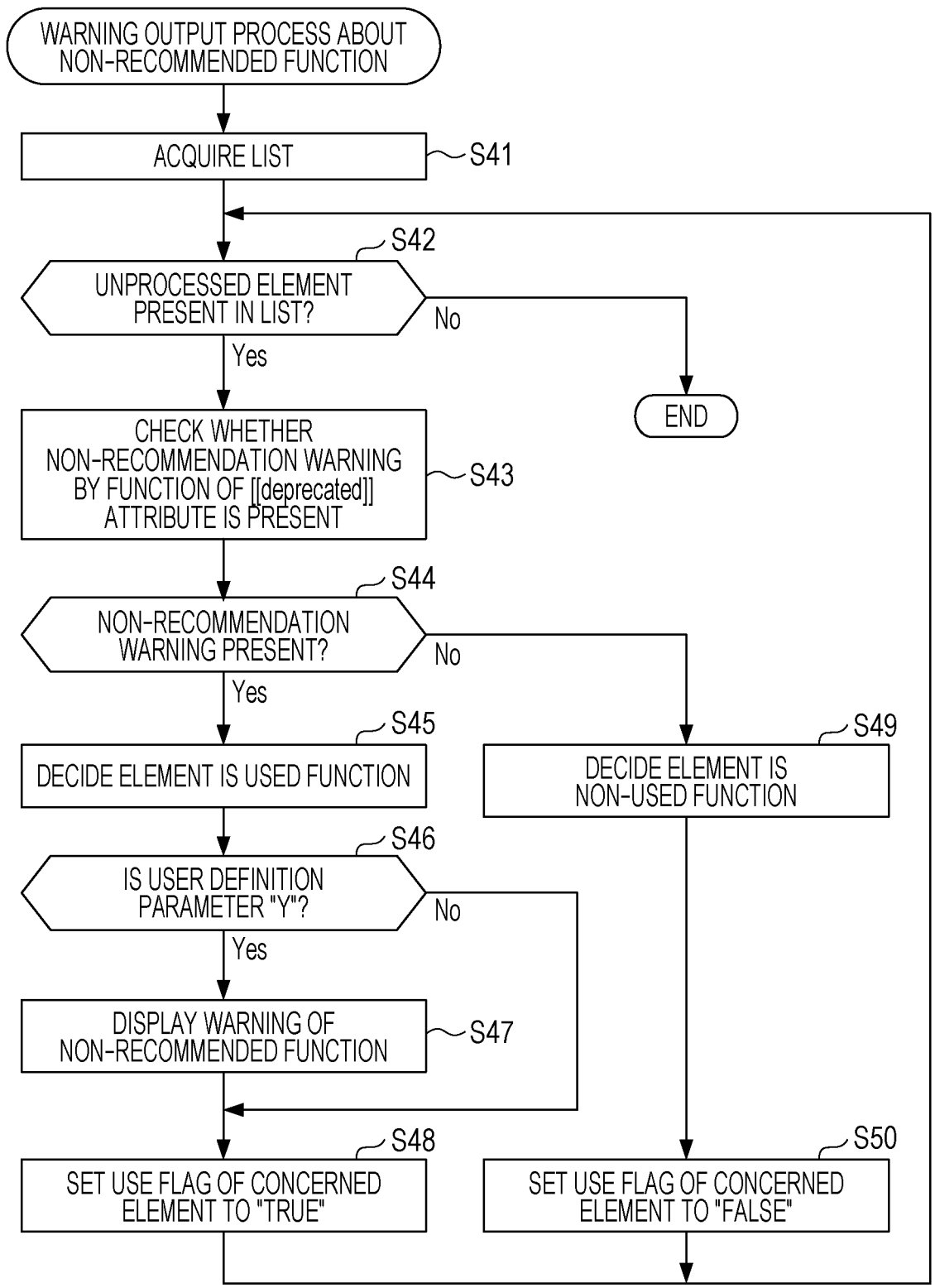
FIG. 22 is a flowchart that illustrates a warning output example for a non-recommended function of the second embodiment.

FIG. 22 is a flowchart that illustrates a warning output example for the non-recommended function of the second embodiment. In the following, a process illustrated in FIG. 22 will be described along step numbers.

(S41) The warning output unit 162 acquires the list L11 that is created for the source file 111 as the present compilation target from a prescribed storage area of the RAM 102.

(S42) The warning output unit 162 assesses whether or not an unprocessed element (the element for which the process of step S43 and subsequent steps is not performed) is present in the list L11. In a case where the unprocessed element is present, the warning output unit 162 moves the process to step S43. In a case where the unprocessed element is not present, the warning output unit 162 finishes the process.

(S43) The warning output unit 162 checks whether a response of the non-recommendation warning by the function of [[deprecated]] attribute (deprecated attribute) is present. For example, the warning output unit 162 checks whether the non-recommendation warning by the function of the deprecated attribute occurs to the concerned element as a result of the semantic analysis of each of the syntax trees, to which the deprecated attribute is attached, by the semantic analysis unit 153.

(S44) The warning output unit 162 assesses whether or not the non-recommendation warning is present for the concerned element by the check in step S43. In a case where the non-recommendation warning is present for the concerned element, the warning output unit 162 moves the process to step S45. In a case where the non-recommendation warning is not present for the concerned element, the warning output unit 162 moves the process to step S49.

(S45) The warning output unit 162 decides that the concerned element is the used function.

(S46) The warning output unit 162 refers to the list L11 and assesses whether or not the user definition parameter for the concerned element is "Y". In a case where the user definition parameter for the concerned element is "Y", the warning output unit 162 moves the process to step S47. In a case where the user definition parameter for the concerned element is not "Y" (that is, in a case of "X"), the warning output unit 162 moves the process to step S48.

(S47) The warning output unit 162 causes the display 11 to display the warning that the concerned element is a non-recommended function.

(S48) The warning output unit 162 sets the use flag of the concerned element as "TRUE" in the list L11. Then, the warning output unit 162 moves the process to step S42.

(S49) The warning output unit 162 decides that the concerned element is the function that is not used.

(S50) The warning output unit 162 sets the use flag of the concerned element as "FALSE" in the list L11. Then, the warning output unit 162 moves the process to step S42.

Here, the reason why the decisions in steps S45 and S49 may be performed is as follows. Fundamentally, the warning function by the deprecated attribute, which indicates that the element is non-recommended, is a function for the compiler to output the warning in a case where the concerned object (element) is "used". Considering this function, it may be considered that "the object for which the warning of non-recommendation is not output by the compiler is not used" among the objects to which the deprecated attribute is attached. Accordingly, it may be considered that in a case where the non-recommendation warning by the compiler occurs to the element to which the deprecated attribute is attached, the element is the used function. On the other hand, it may be considered that in a case where the non-recommendation warning by the compiler does not occur to the element to which the deprecated attribute is attached, the element is the function that is not used.

Further, as indicated by the procedures in steps S43 to S50, the compiler device 100 decides the unused symbol in accordance with presence or absence of the warning about the deprecated attribute together with an output process of the warning about the deprecated attribute. That is, the compiler device 100 decides the unused symbol in procedures of the output process of the warning about the deprecated attribute in compilation. More specifically, in a case where the warning about the deprecated attribute is present, the warning output unit 162 decides that the concerned symbol to which the deprecated attribute is attached is used. Further, in a case where the warning about the deprecated attribute is not present, the warning output unit 162 decides that the concerned symbol to which the deprecated attribute is attached is unused.

Thus, a routine for deciding the unused symbol does not have to be separately performed from compilation. Specifically, the checking process of whether or not each of the symbols is used does not have to be performed separately from compilation. Consequently, the compiler device 100 may efficiently perform extraction of the unused symbols. Further, extraction of the unused symbol may be made faster than separately performing the routine for extracting the unused symbol.

Further, based on the assessment in step S46, the compiler device 100 may set the non-recommendation warnings as display targets of the display 11 while narrowing the elements (symbols) down to the elements (symbols) to which the deprecated attribute is in advance added by the user. That is, the compiler device 100 restricts display by the display 11 of the non-recommendation warnings about the elements (symbols) to which the deprecated attribute is added by the attribute addition unit 161. Consequently, the non-recommendation warnings may be displayed while the elements are narrowed down to the elements about which the user intends to display the non-recommendation warnings.

FIGS. 23A and 23B are diagrams that illustrate examples of the lists in which the use flags are set. FIG. 23A illustrates the contents of the list L10. The list L10 is in a state where the use flags are set compared to the list L11. FIG. 23B illustrates the contents of the list L20. The list L20 is in a state where the use flags are set compared to the list L21.

Referring to the example of the list L10, the use flags that correspond to the elements of "int global_x", "struct X", "int X::x" (the member variable "x" of the structure "X"), "static int X::y", "void func01( )", and "void func03( )" in the source file 111 are "FALSE". This indicates that the elements of "int global_x", "struct X", "int X::x" (the member variable "x" of the structure "X"), "static int X::y", "void func01( )", and "void func03( )" are not used in the source file 111.

On the other hand, in the list L10, the use flags that correspond to the elements of "int global_y" and "void func02( )" in the source file 111 are "TRUE". This indicates that the elements of "int global_y" and "void func02( )" are used in the source file 111.

Similarly, referring to the example of the list L20, the use flags that correspond to the elements of "int global_y", "void func01 (void)", "void func02(void)", "struct X", "int X::x", and "static int X::y" in the source file 112 are "FALSE". This indicates that the elements of "int global_y", "void func01 (void)", "void func02(void)", "struct X", "int X::x", and "static int X::y" are not used in the source file 112.

On the other hand, in the list L20, the use flags that correspond to the elements of "int global_x" and "void func03(void)" in the source file 112 are "TRUE". This indicates that the elements of "int global_x" and "void func03(void)" are used in the source file 112.

The list L10 is added to the object file 131. Further, the list L20 is added to the object file 132. Then, the object files 131 and 132 are stored in the object file storage unit 130.

Next, a description will be made about procedures of a generation process of the executable file based on the object files 131 and 132 that are generated as described above. The compiler device 100 couples the object files 131 and 132 together (performs the linking process) and thereby generates the executable file.

Figure 24:
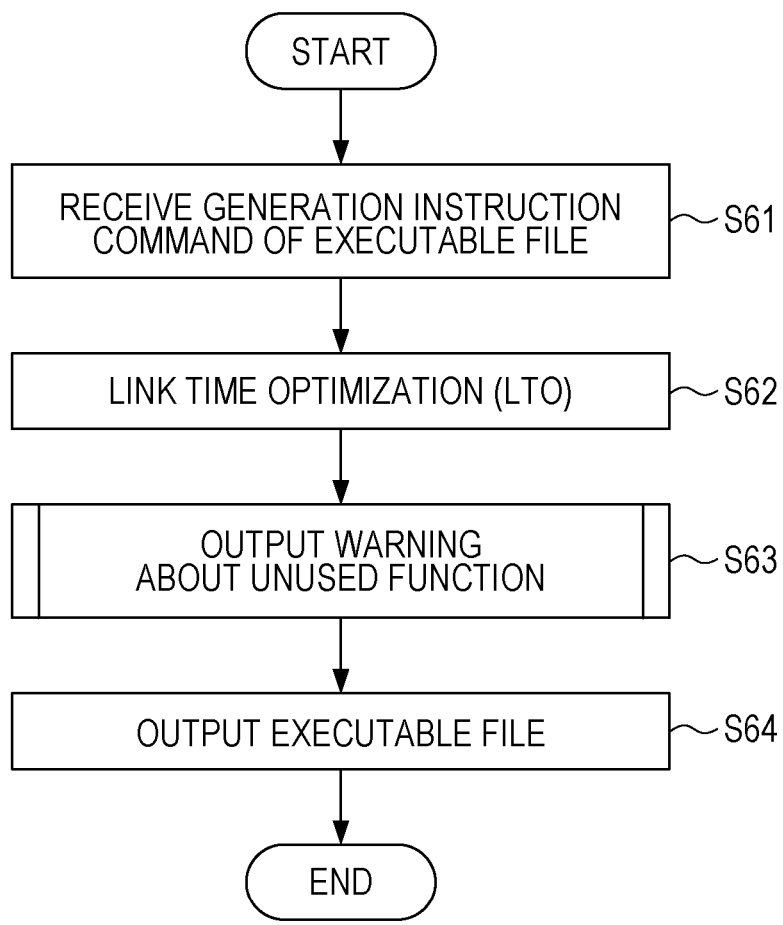
FIG. 24 is a flowchart that illustrates a linking process example of the second embodiment.

FIG. 24 is a flowchart that illustrates a linking process example of the second embodiment. In the following, a process illustrated in FIG. 24 will be described along step numbers.

(S61) The LTO processing unit 181 receives a generation instruction command of the executable file. The generation instruction command of the executable file is the command that is indicated in the third line in FIG. 15, for example. For example, the command designates the object files 131 and 132 that are stored in the object file storage unit 130 as link targets.

(S62) The LTO processing unit 181 executes a link time optimization (LTO) process based on the object files 131 and 132. Here, the LTO processing unit 181 extracts the list L10 from the object file 131 as the link target and provides the list L10 to the list coupling unit 182. Further, the LTO processing unit 181 extracts the list L20 from the object file 132 as the link target and provides the list L20 to the list coupling unit 182.

(S63) The list coupling unit 182 executes a process of warning output for an unused function based on the lists L10 and L20 that are acquired from the LTO processing unit 181. Details of the process will be described later.

(S64) The LTO processing unit 181 generates the executable file based on the object files 131 and 132 and outputs the generated executable file. Specifically, the LTO processing unit 181 stores the generated executable file in the executable file storage unit 140.

Figure 25:
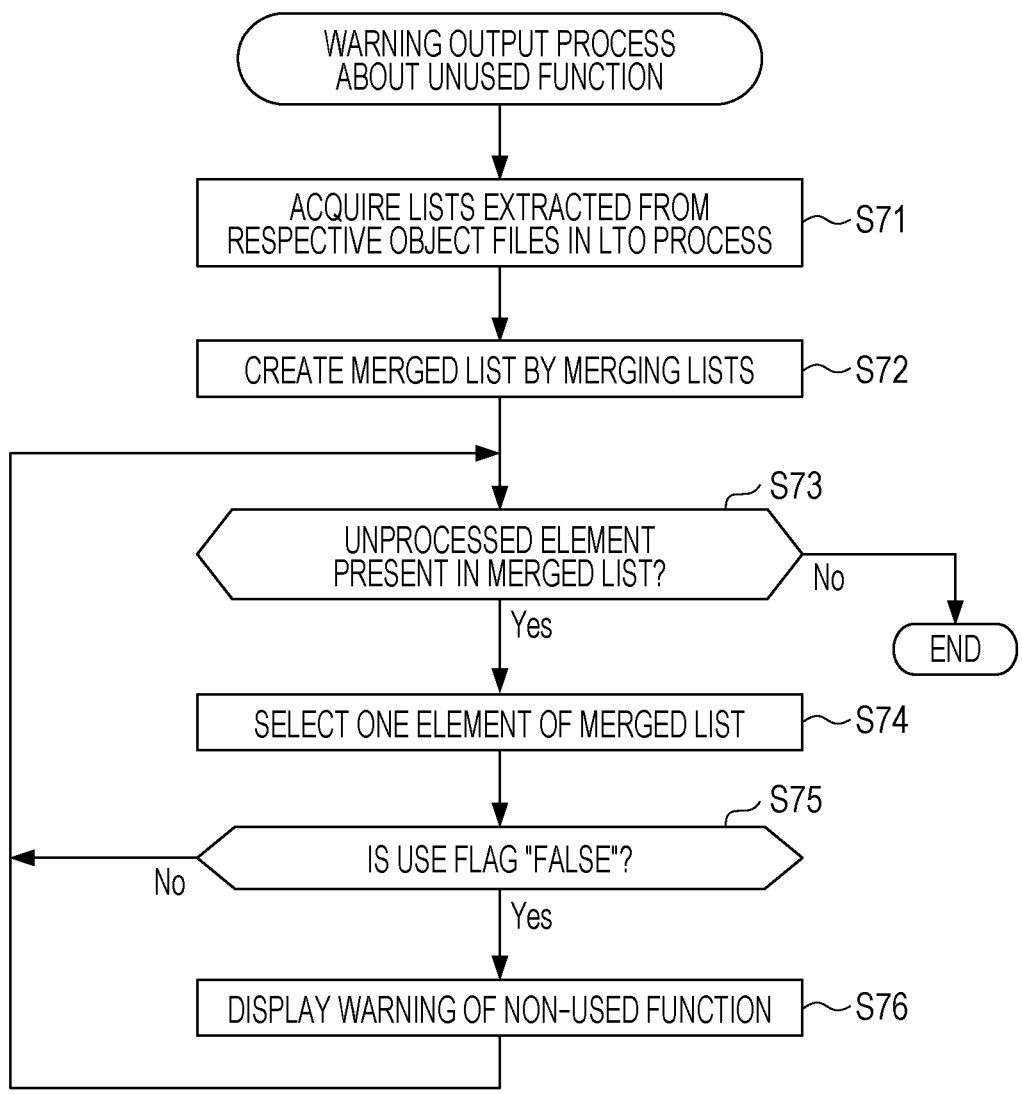
FIG. 25 is a flowchart that illustrates a warning output example for an unused function of the second embodiment.

FIG. 25 is a flowchart that illustrates a warning output example for the unused function of the second embodiment. In the following, a process illustrated in FIG. 25 will be described along step numbers. The procedures indicated in the following are correspondent to step S63 in FIG. 24.

(S71) The list coupling unit 182 acquires the lists L10 and L20 that are extracted from the object files 131 and 132 in the LTO process by the LTO processing unit 181.

(S72) The list coupling unit 182 merges the lists L10 and L20 and creates the merged list. Specifically, the list coupling unit 182 registers the element name that is included in at least one of the lists L10 and L20 in the item of the element name of the merged list. Further, the list coupling unit 182 refers to the use flag in each of the lists L10 and L20 with respect to the element name registered in the merged list and sets the use flag for the element name in the merged list as "TRUE" in a case where the use flag in at least one of the lists L10 and L20 is "TRUE". In a case where the use flags in both of those are "FALSE", the list coupling unit 182 sets the use flag for the element name in the merged list as "FALSE". The user definition parameter is set as "Y" in a case where "Y" is in at least one of the lists L10 and L20 but sets "X" in a case where "X" is in both of those.

Here, in a case where substantially the same element name is present in the lists L10 and L20, the list coupling unit 182 determines that the element name exists in both of the lists L10 and L20. For example, "void func01( )" in the list L10 and "void func01(void)" in the list L20 are substantially the same. Accordingly, the list coupling unit 182 adopts the element name that is registered in one of the lists L10 and L20 (for example, "void func01(void)") and adds the element name to the merged list. The list coupling unit 182 stores the list that is created in a prescribed storage area of the RAM 102.

(S73) The result output unit 183 assesses whether or not an unprocessed element is present in the merged list. In a case where the unprocessed element (the element for which the process of step S74 and subsequent steps is not performed) is present in the merged list, the result output unit 183 moves the process to step S74. In a case where the unprocessed element is not present in the merged list, the result output unit 183 finishes the process.

(S74) The result output unit 183 selects one element in the merged list. Here, the element to be a selection target is the element that is not yet selected.

(S75) The result output unit 183 refers to the merged list and assesses whether or not the use flag that corresponds to the element is "FALSE". In a case where the use flag is "FALSE", the result output unit 183 moves the process to step S76. In a case where the use flag is not "FALSE" (that is, in a case of "TRUE"), the result output unit 183 moves the process to step S73.

(S76) The result output unit 183 causes the display 11 to display the warning that the concerned element is the function that is not used. Then, the result output unit 183 moves the process to step S73.

FIG. 26 is a diagram that illustrates an example of the merged list. A list L30 is the result of merging of the lists L10 and L20. For example, in the list L30, the use flag is decided about each of the elements as follows.

With respect to the element name "int global_x", the use flag in the list L10 is "FALSE", and the use flag in the list L20 is "TRUE". Accordingly, the use flag of the element name "int global_x" in the list L30 is "TRUE".

With respect to the element name "int global_y", the use flag in the list L10 is "TRUE", and the use flag in the list L20 is "FALSE". Accordingly, the use flag of the element name "int global_y" in the list L30 is "TRUE".

With respect to the element name "struct X", the use flag in the list L10 is "FALSE", and the use flag in the list L20 is "FALSE". Accordingly, the use flag of the element name "struct X" in the list L30 is "FALSE".

With respect to the element name "int X::x", the use flag in the list L10 is "FALSE", and the use flag in the list L20 is "FALSE". Accordingly, the use flag of the element name "int X::x" in the list L30 is "FALSE".

With respect to the element name "static int X::y", the use flag in the list L10 is "FALSE", and the use flag in the list L20 is "FALSE". Accordingly, the use flag of the element name "static int X::y" in the list L30 is "FALSE".

With respect to the element name "void func01(void)", the use flag in the list L10 is "FALSE", and the use flag in the list L20 is "FALSE". Accordingly, the use flag of the element name "void func01(void)" in the list L30 is "FALSE".

With respect to the element name "void func02(void)", the use flag in the list L10 is "TRUE", and the use flag in the list L20 is "FALSE". Accordingly, the use flag of the element name "void func02(void)" in the list L30 is "TRUE".

With respect to the element name "void func03(void)", the use flag in the list L10 is "FALSE", and the use flag in the list L20 is "TRUE". Accordingly, the use flag of the element name "void func03(void)" in the list L30 is "TRUE".

Based on the list L30, the result output unit 183 causes the display 11 to display a warning that the codes which are correspondent to "struct X", "int X::x", "static int X::y", and "void func01(void)" in the source files 111 and 112 are unused.

FIG. 27 is a diagram that illustrates a display example of a warning that indicates the elements are unused. A message group 11b is a display example of a warning message that indicates that the concerned elements are unused. For example, the result output unit 183 specifies the description parts in the source files 111 and 112 from the concerned element names in the list L30. Further, the result output unit 183 may cause the display 11 to display the file names of the source files 111 and 112 and information that indicates the description parts (for example, the line numbers, the numbers that represent the positions from the line heads, and so forth).

In such a manner, the compiler device 100 utilizes the output function of the non-recommendation warning by the deprecated attribute to perform extraction of the unused elements in the source code. Consequently, it becomes possible to easily implement an extraction function of the unused elements in the source code to the compiler. That is, it becomes possible to easily realize the extraction function of the unused elements in the source code as a portion of functions of the compiler or as an additional function of the compiler.

In addition, the compiler device 100 decides the unused symbol in accordance with presence or absence of the warning about the deprecated attribute together with the output process of the warning about the deprecated attribute. Thus, the routine for deciding the unused symbol does not have to be separately performed from compilation. Specifically, the checking process of whether or not each of the symbols is used does not have to be performed separately from compilation. Consequently, the compiler device 100 may efficiently perform extraction of the unused symbols. Further, extraction of the unused symbol may be made faster than separately performing the routine for extracting the unused symbol.

Further, the compiler device 100 presents the unused elements in the source files 111 and 112 to the user and may thereby support specifying of reviewed parts of the source code by the user. Further, the compiler device 100 may use the list L30 to intend an efficiency improvement of compilation. Details are as follows.

Figure 28:
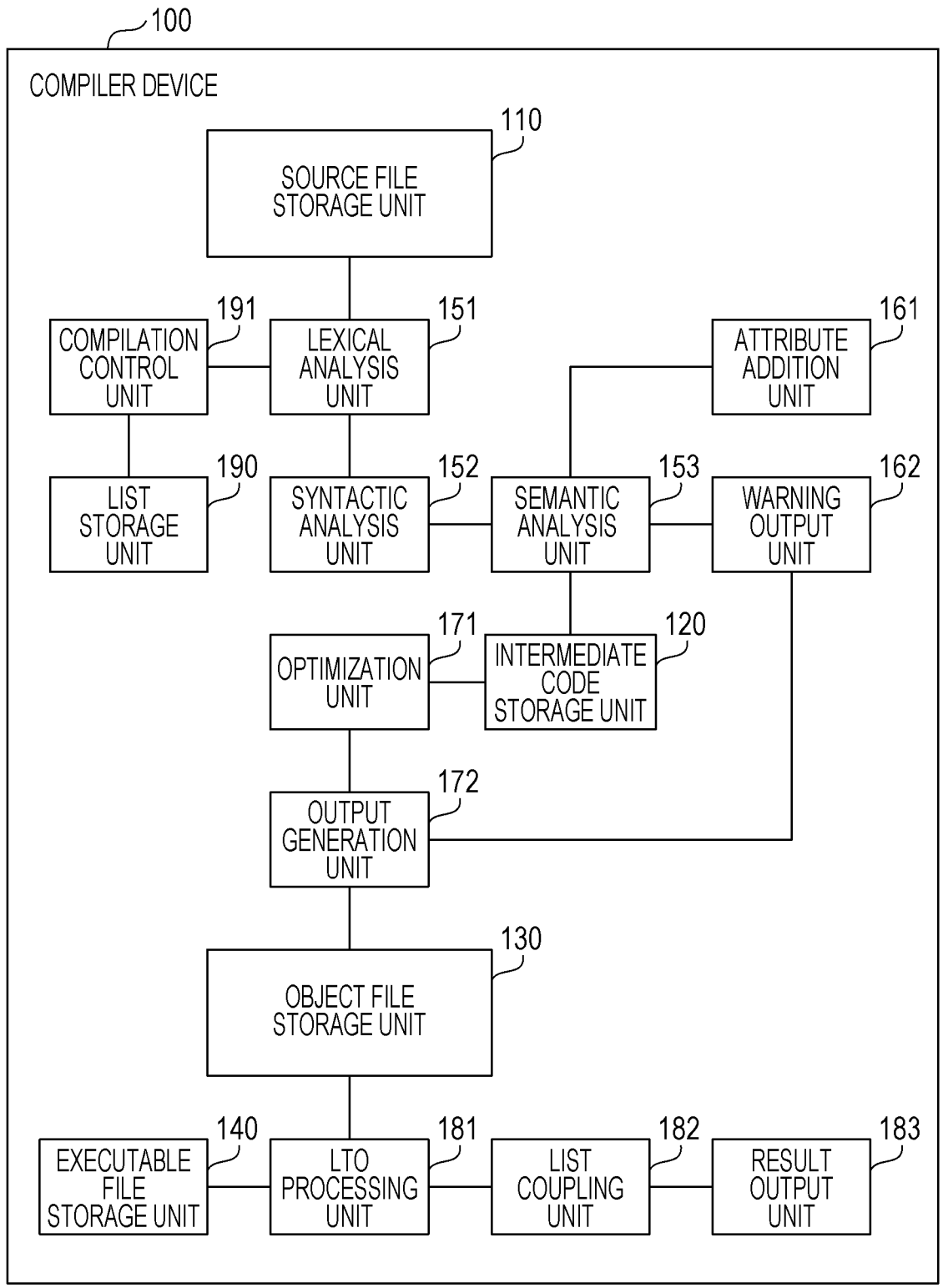
FIG. 28 is a diagram that illustrates another function example of the compiler device.

FIG. 28 is a diagram that illustrates another function example of the compiler device. For example, the compiler device 100 may further have a list storage unit 190 and a compilation control unit 191 in addition to the functions exemplified in FIG. 9. The list storage unit 190 is realized by using a prescribed storage area of the RAM 102 or the HDD 103. The compilation control unit 191 is realized by execution of a program stored in the RAM 102 by the processor 101.

The list storage unit 190 stores the list L30 that is generated by the list coupling unit 182 while associating the list L30 with the file names of the source files 111 and 112.

The compilation control unit 191 narrows down compilation target parts in the source files based on the information stored in the list storage unit 190. Specifically, the compilation control unit 191 searches for a created list about the source file to be the target of compilation from the list storage unit 190 and sets the elements whose use flags in the list are "FALSE" as non-targets of compilation. For example, the compilation control unit 191 may add prescribed metadata that instruct the compiler to set the concerned elements as non-targets of compilation to the target source file. Alternatively, the compilation control unit 191 may create a new source file in which the elements as non-targets of compilation are deleted from the original source file and instruct the compiler to compile the new source file.

Next, a description will be made about process procedures by the compiler device 100 based on the function of the compilation control unit 191.

Figure 29:
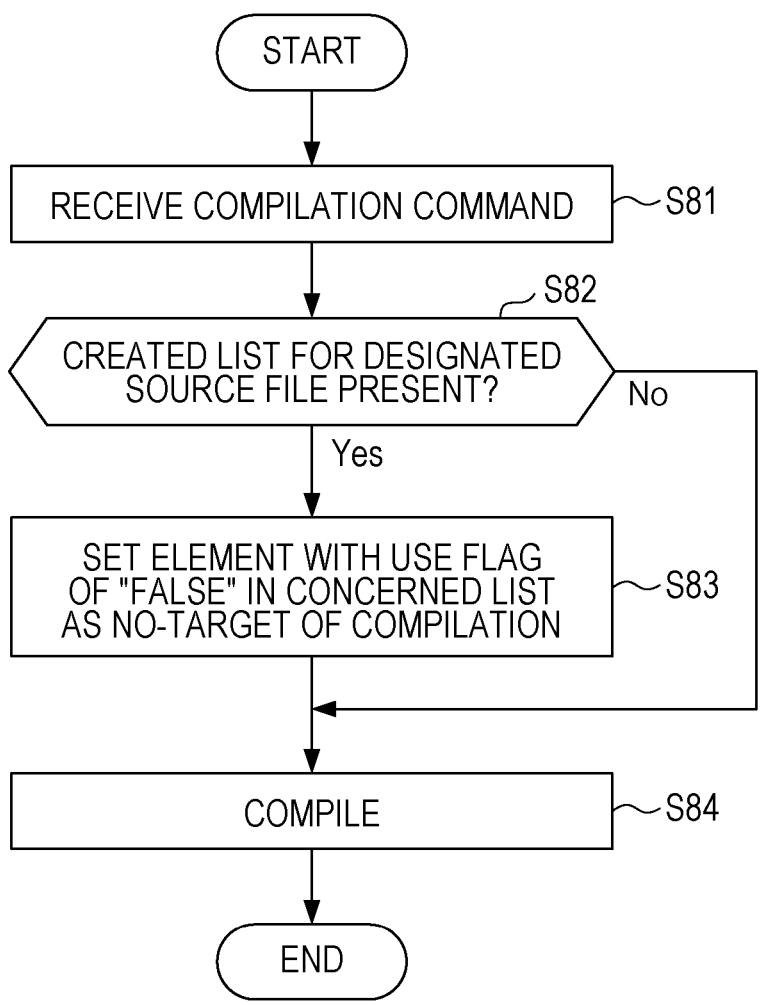
FIG. 29 is a flowchart that illustrates a compilation control example of the second embodiment.

FIG. 29 is a flowchart that illustrates a compilation control example of the second embodiment. In the following, a process illustrated in FIG. 29 will be described along step numbers.

(S81) The compilation control unit 191 receives a compilation command. The compilation command includes the file name of the source file 111 as the compilation target, for example.

(S82) The compilation control unit 191 assesses whether or not the created list about the designated source file is present in the list storage unit 190. In a case where the created list is present, the compilation control unit 191 moves the process to step S83. In a case where the created list is not present, the compilation control unit 191 moves the process to step S84. For example, the created list about the source file 111 is the list L30.

(S83) The compilation control unit 191 sets the elements whose use flags in the concerned list are "FALSE" as non-targets of compilation. For example, the compilation control unit 191 sets the elements whose use flags in the list L30 are set to "FALSE" among the elements included in the source file 111 as non-targets of compilation. As described above, the compilation control unit 191 may add prescribed metadata that instruct that the concerned elements are set as non-targets of compilation to the source file 111. Alternatively, the compilation control unit 191 may create a new source file in which the concerned elements are deleted. In the case of creating a new source file, the compilation control unit 191 may instruct the compiler (for example, the lexical analysis unit 151 thereof) to start compilation of the new source file instead of the original source file 111.

(S84) The lexical analysis unit 151 starts the lexical analysis process. Subsequently, the object file is generated (compilation is executed) by a series of functions of the syntactic analysis unit 152, the semantic analysis unit 153, the optimization unit 171, and the output generation unit 172. Note that in this case, the compilation control unit 191 may regulate an addition process of the deprecated attribute by the attribute addition unit 161.

In such a manner, the compiler device 100 may omit compilation of the elements (symbols) that are not used in the source file 111 based on the created list L30. Similarly for the source file 112, the compiler device 100 may omit compilation of the elements (symbols) that are not used in the source file 112 based on the list L30.

Consequently, an efficiency improvement of compilation may be intended. For example, the processes that accompany compilation may be made faster, and the requested time for compilation may thereby be shortened.

Note that the information processing of the first embodiment may be realized by causing the processing unit 1b to execute the program. Further, the information processing of the second embodiment may be realized by causing the processor 101 to execute the program. The program may be recorded in the computer-readable recording medium 13.

For example, the recording mediums 13 that record the program are distributed, and the program may thereby be circulated. Further, the program is stored in another computer, and the program may thereby be distributed via a network. For example, the computer stores (installs) the program that is recorded in the recording medium 13 or received from the other computer in the storage device such as the RAM 102 or the HDD 103 and may thereby reads the program from the storage device and execute the program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A non-transitory, computer-readable recording medium having stored therein a compiler program that causes a computer to execute a process comprising:

in response to receiving a compilation command, performing a compilation process on a first source file including first attribute information that is added to a first symbol in the first source file, and using the first attribute information being used for the compilation process to output a notification indicating a warning about use of the first symbol;

generating a second source file by adding second attribute information to a second symbol in the first source file, and using the second attribute information in the compilation process to output use information indicating whether the second symbol is used in a process described in the first source file;

performing the compilation process on the second source file and recording the use information that has been outputted in a memory in association with the second symbol;

in response to the use information corresponding to the second symbol recorded in the memory indicating that the second symbol is not used, determining that the second symbol is an unused symbol which is not used in a process described in the first source file; and outputting information of the unused symbol to a display device.

2. The non-transitory, computer-readable recording medium of claim 1, wherein the source code is divided into plural source files, and in the determining of the unused symbol, each of the plural source files is individually compiled, plural output results of the information are acquired for the plural source files, and the unused symbol is decided based on the plural output results.

3. The non-transitory, computer-readable recording medium of claim 2, wherein a first output result of the information on a first source file is added to a first object file that is generated from the first source file, a second output result of the information on a second source file is added to a second object file that is generated from the second source file, and in the determining of the unused symbol, in a linking process that uses the first and second object files, the unused symbol is decided based on the first and second output results.

4. The non-transitory, computer-readable recording medium of claim 1, wherein the process further comprising setting the unused symbol as a non-target of compilation based on the information.

5. The non-transitory, computer-readable recording medium of claim 1, wherein a deprecated attribute is used as the first attribute information and the second attribute information.

6. An apparatus comprising:

a memory; and a processor coupled to the memory and configured to:

in response to receiving a compilation command, perform a compilation process on a first source file including first attribute information that is added to a first symbol in the first source file, and use the first attribute information being used for the compilation process to output a notification indicating a warning about use of the first symbol;

generate a second source file by adding second attribute information to a second symbol in the first source file, and use the second attribute information in the compilation process to output use information indicating whether the second symbol is used in a process described in the first source file;

perform the compilation process on the second source file and record the use information that has been outputted in a memory in association with the second symbol;

in response to the use information corresponding to the second symbol recorded in the memory indicating that the second symbol is not used, determine that the second symbol is an unused symbol which is not used in a process described in the first source file; and output information of the unused symbol to a display device.

7. A method comprising:

in response to receiving a compilation command, performing a compilation process on a first source file including first attribute information that is added to a first symbol in the first source file, and using the first attribute information being used for the compilation process to output a notification indicating a warning about use of the first symbol;

generating a second source file by adding second attribute information to a second symbol in the source file, and using the second attribute information in the compilation process to output use information indicating whether the second symbol is used in a process described in the first source file;

performing the compilation process on the second source file and recording the use information that has been outputted in a memory in association with the second symbol;

in response to the use information corresponding to the second symbol recorded in the memory indicating that the second symbol is not used, determining that the second symbol is an unused symbol which is not used in a process described in the first source file; and outputting information of the unused symbol to a display device.

* * * * *